United States Patent
Asmus et al.

(10) Patent No.: US 10,101,731 B2
(45) Date of Patent: Oct. 16, 2018

(54) LOW LEVEL CENTRAL PLANT OPTIMIZATION

(71) Applicant: Johnson Controls Technology Company, Holland, MI (US)

(72) Inventors: Matthew J. Asmus, Watertown, WI (US); Robert D. Turney, Watertown, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 520 days.

(21) Appl. No.: 14/634,615

(22) Filed: Feb. 27, 2015

(65) Prior Publication Data

US 2015/0316903 A1 Nov. 5, 2015

Related U.S. Application Data

(60) Provisional application No. 61/987,361, filed on May 1, 2014.

(51) Int. Cl.
*G05B 19/418* (2006.01)
*G05B 13/02* (2006.01)
(Continued)

(52) U.S. Cl.
CPC ......... *G05B 19/418* (2013.01); *G05B 13/021* (2013.01); *G05B 13/048* (2013.01);
(Continued)

(58) Field of Classification Search
CPC .... G05B 19/418; G05B 15/02; G05B 13/048; G05B 13/021; G05B 2219/2642;
(Continued)

(56) References Cited

U.S. PATENT DOCUMENTS

| 4,349,869 A | 9/1982 | Prett et al. |
| 4,616,308 A | 10/1986 | Morshedi et al. |
| (Continued) | | |

FOREIGN PATENT DOCUMENTS

| CN | 102331758 A | 1/2012 |
| CN | 102331759 A | 1/2012 |
| (Continued) | | |

OTHER PUBLICATIONS

Chang et al., "Optimal chiller sequencing by branch and boun method for saving energy", 2004 Elsevier.*

(Continued)

*Primary Examiner* — Carlos Ortiz Rodriguez
(74) *Attorney, Agent, or Firm* — Foley & Lardner LLP

(57) ABSTRACT

Systems and methods for low level central plant optimization are provided. A controller for the central plant uses binary optimization to determine one or more feasible on/off configurations for equipment of the central plant that satisfy operating constraints and meet a thermal energy load setpoint. The controller determines optimum operating setpoints for each feasible on/off configuration and generates operating parameters including at least one of the feasible on/off configurations and the optimum operating setpoints. The operating parameters optimize an amount of energy consumed by the central plant equipment. The controller outputs the generated operating parameters via a communications interface for use in controlling the central plant equipment.

16 Claims, 9 Drawing Sheets

(51) Int. Cl.
*G05F 1/66* (2006.01)
*G05B 13/04* (2006.01)
*G05B 15/02* (2006.01)
*G06N 99/00* (2010.01)
*G06Q 10/04* (2012.01)
*G06Q 10/06* (2012.01)
*G06Q 50/06* (2012.01)

(52) U.S. Cl.
CPC .............. *G05B 15/02* (2013.01); *G05F 1/66* (2013.01); *G06N 99/005* (2013.01); *G06Q 10/04* (2013.01); *G06Q 10/06* (2013.01); *G06Q 50/06* (2013.01); *G05B 2219/2642* (2013.01); *G05B 2219/31414* (2013.01); *G05B 2219/32021* (2013.01); *Y02P 70/161* (2015.11); *Y02P 80/114* (2015.11); *Y02P 90/86* (2015.11)

(58) Field of Classification Search
CPC ........... G05B 2219/32021; G05B 2219/31414; G06Q 10/04; G06Q 50/06; G06Q 10/06; G06N 99/005; G05F 1/66; Y02P 70/161
See application file for complete search history.

(56) References Cited

U.S. PATENT DOCUMENTS

| | | | |
|---|---|---|---|
| 5,301,101 A | 4/1994 | MacArthur | |
| 5,347,446 A | 9/1994 | Iino et al. | |
| 5,351,184 A | 9/1994 | Lu | |
| 5,408,406 A | 4/1995 | Mathur et al. | |
| 5,442,544 A | 8/1995 | Jelinek | |
| 5,519,605 A | 5/1996 | Cawlfield | |
| 5,572,420 A | 11/1996 | Lu | |
| 5,778,059 A | 7/1998 | Loghmani et al. | |
| 6,055,483 A | 4/2000 | Lu | |
| 6,122,555 A | 9/2000 | Lu | |
| 6,278,899 B1 | 8/2001 | Piche et al. | |
| 6,347,254 B1 | 2/2002 | Lu | |
| 6,459,939 B1 | 10/2002 | Hugo | |
| 6,807,510 B1 | 10/2004 | Backstrom | |
| 7,050,863 B2 | 5/2006 | Mehta et al. | |
| 7,050,866 B2 | 5/2006 | Martin et al. | |
| 7,113,890 B2 | 9/2006 | Frerichs et al. | |
| 7,152,023 B2 | 12/2006 | Das | |
| 7,165,399 B2 | 1/2007 | Stewart | |
| 7,188,779 B2 | 3/2007 | Alles | |
| 7,197,485 B2 | 3/2007 | Fuller | |
| 7,203,554 B2 | 4/2007 | Fuller | |
| 7,266,416 B2 | 9/2007 | Gallestey | |
| 7,272,454 B2 | 9/2007 | Wojsznis et al. | |
| 7,275,374 B2 | 10/2007 | Stewart et al. | |
| 7,328,074 B2 | 2/2008 | Das et al. | |
| 7,328,577 B2 | 2/2008 | Stewart et al. | |
| 7,376,471 B2 | 5/2008 | Das et al. | |
| 7,376,472 B2 | 5/2008 | Wojsznis et al. | |
| 7,389,773 B2 | 6/2008 | Stewart et al. | |
| 7,400,933 B2 | 7/2008 | Rawlings et al. | |
| 7,418,372 B2 | 8/2008 | Nishira et al. | |
| 7,424,409 B2 | 9/2008 | Ben-Gal et al. | |
| 7,454,253 B2 | 11/2008 | Fan | |
| 7,496,413 B2 | 2/2009 | Fan et al. | |
| 7,577,483 B2 | 8/2009 | Fan et al. | |
| 7,591,135 B2 | 9/2009 | Stewart | |
| 7,610,108 B2 | 10/2009 | Boe et al. | |
| 7,650,195 B2 | 1/2010 | Fan et al. | |
| 7,664,573 B2 | 2/2010 | Ahmed | |
| 7,676,283 B2 | 3/2010 | Liepold et al. | |
| 7,826,909 B2 | 11/2010 | Attarwala | |
| 7,827,813 B2 | 11/2010 | Seem | |
| 7,844,352 B2 | 11/2010 | Vouzis et al. | |
| 7,856,281 B2 | 12/2010 | Thiele et al. | |
| 7,878,178 B2 | 2/2011 | Stewart et al. | |
| 7,894,943 B2 | 2/2011 | Sloup et al. | |
| 7,930,045 B2 | 4/2011 | Cheng | |
| 7,945,352 B2 | 5/2011 | Koc | |
| 7,949,416 B2 | 5/2011 | Fuller | |
| 7,987,145 B2 | 7/2011 | Baramov | |
| 7,996,140 B2 | 8/2011 | Stewart et al. | |
| 8,005,575 B2 | 8/2011 | Kirchhof | |
| 8,032,235 B2 | 10/2011 | Sayyar-Rodsari | |
| 8,036,758 B2 | 10/2011 | Lu et al. | |
| 8,046,089 B2 | 10/2011 | Renfro et al. | |
| 8,060,258 B2 | 11/2011 | Butoyi | |
| 8,060,290 B2 | 11/2011 | Stewart et al. | |
| 8,073,659 B2 | 12/2011 | Gugaliya et al. | |
| 8,078,291 B2 | 12/2011 | Pekar et al. | |
| 8,096,140 B2 | 1/2012 | Seem | |
| 8,105,029 B2 | 1/2012 | Egedal et al. | |
| 8,109,255 B2 | 2/2012 | Stewart et al. | |
| 8,121,818 B2 | 2/2012 | Gorinevsky | |
| 8,126,575 B2 | 2/2012 | Attarwala | |
| 8,145,329 B2 | 3/2012 | Pekar et al. | |
| 8,180,493 B1 | 5/2012 | Laskow | |
| 8,185,217 B2 | 5/2012 | Thiele | |
| 8,200,346 B2 | 6/2012 | Thiele | |
| 8,495,888 B2 | 7/2013 | Seem | |
| 8,600,561 B1 | 12/2013 | Modi et al. | |
| 8,843,238 B2 | 9/2014 | Wenzel et al. | |
| 9,002,532 B2 | 4/2015 | Asmus | |
| 9,679,248 B2 | 6/2017 | Lecue et al. | |
| 2003/0033587 A1 | 2/2003 | Ferguson et al. | |
| 2004/0225649 A1 | 11/2004 | Yeo et al. | |
| 2005/0240427 A1 | 10/2005 | Crichlow | |
| 2006/0065750 A1* | 3/2006 | Fairless | F23N 5/203 236/46 R |
| 2009/0062969 A1 | 3/2009 | Chandra et al. | |
| 2009/0313083 A1 | 12/2009 | Dillon et al. | |
| 2009/0319090 A1 | 12/2009 | Dillon et al. | |
| 2010/0087933 A1 | 4/2010 | Cheng | |
| 2010/0235004 A1 | 9/2010 | Thind | |
| 2010/0269854 A1 | 10/2010 | Barbieri et al. | |
| 2011/0022193 A1 | 1/2011 | Panaitescu | |
| 2011/0060424 A1 | 3/2011 | Havlena | |
| 2011/0066258 A1 | 3/2011 | Torzhkov et al. | |
| 2011/0066298 A1 | 3/2011 | Francino et al. | |
| 2011/0088000 A1 | 4/2011 | Mackay | |
| 2011/0125293 A1 | 5/2011 | Havlena | |
| 2011/0153103 A1 | 6/2011 | Brown et al. | |
| 2011/0257789 A1 | 10/2011 | Stewart et al. | |
| 2011/0301723 A1 | 12/2011 | Pekar et al. | |
| 2012/0010757 A1 | 1/2012 | Francino et al. | |
| 2012/0010758 A1 | 1/2012 | Francino et al. | |
| 2012/0059351 A1 | 3/2012 | Nordh | |
| 2012/0060505 A1 | 3/2012 | Fuller et al. | |
| 2012/0109620 A1 | 5/2012 | Gaikwad et al. | |
| 2012/0116546 A1 | 5/2012 | Sayyar-Rodsari | |
| 2012/0185728 A1 | 7/2012 | Guo et al. | |
| 2012/0290230 A1 | 11/2012 | Berges Gonzalez et al. | |
| 2012/0308988 A1 | 12/2012 | Discenzo | |
| 2012/0316914 A1 | 12/2012 | Lee et al. | |
| 2013/0003543 A1 | 1/2013 | Ludwig | |
| 2013/0178993 A1 | 7/2013 | Rombouts et al. | |
| 2013/0345880 A1 | 12/2013 | Asmus | |
| 2014/0266682 A1 | 9/2014 | Gettings et al. | |
| 2015/0134135 A1 | 5/2015 | Wong et al. | |
| 2015/0185716 A1* | 7/2015 | Wichmann | F01K 23/101 700/287 |

FOREIGN PATENT DOCUMENTS

| | | |
|---|---|---|
| CN | 102893227 A | 1/2013 |
| WO | WO-2011/080548 | 7/2011 |
| WO | WO-2014/043623 A1 | 3/2014 |

OTHER PUBLICATIONS

Kapoor et al., Improved Large-Scale Process Cooling Operation through Energy Optimization, Nov. 22, 2013, Process 2013, 1, 312-329; doi: 10.3390/pr1030312.

Office Action for U.S. Appl. No. 14/634,573, dated Apr. 26, 2017, 22 pages.

(56) References Cited

OTHER PUBLICATIONS

Extended European Search Report for EP Application No. 16154938.1, dated Jun. 23, 2016, 8 pages.
Extended European Search Report for EP Application No. 16154940.7, dated Jun. 30, 2016, 7 pages.
U.S. Appl. No. 13/802,154, filed Mar. 13, 2013, Johnson Controls Technology Company.
U.S. Appl. No. 13/802,233, filed Mar. 13, 2013, Johnson Controls Technology Company.
U.S. Appl. No. 13/802,279, filed Mar. 13, 2013, Johnson Controls Technology Company.
Deng et al., Optimal Scheduling of Chiller Plant with Thermal Energy Storage using Mixed Integer Linear Programming, Jun. 17-19, 2013, American Control Conference (ACC) 2013, 6 pages.
Gunter et al., Optimal Design of Grid-Connected PEV Charging Systems With Integrated Distributed Resources, IEEE Transactions on Smart Grid 4, No. 2 (n.d.): 956-967, 13 pages.
Zakeri et al., Optimization of Demand Response Through Peak Shaving, Oct. 25, 2013, 9 pages.
Examination Report for European Application No. 16154938.1, dated Mar. 27, 2017, 5 pages.
Examination Report for European Application No. 16154940.7, dated Mar. 28, 2017, 5 pages.
Office Action for U.S. Appl. No. 14/634,599, dated Mar. 29, 2017, 23 pages.
Office Action for U.S. Appl. No. 14/634,609, dated Apr. 14, 2017, 24 pages.
Examination Report for European Application No. 16154938.1, dated Oct. 11, 2017, 4 pages.
Examination Report for European Application No. 16154940.7, dated Oct. 16, 2017, 4 pages.
Gunter et al., Optimal Design of Grid-Connected PEV Charging System with Integrated Distributed Resources, IEEE Transactions on Smart Grid 4, Jun. 2013, 12 pages.
Office Action for U.S. Appl. No. 14/634,599, dated Nov. 3, 2017, 24 pages.
Office Action for U.S. Appl. No. 14/634,573, dated Dec. 14, 2017, 22 pages.
Office Action for European Patent Application No. 16154938.1, dated Mar. 6, 2018. 5 pages.
Office Action for European Patent Application No. 16154940.7 dated Mar. 9, 2018. 4 pages.
Office Action on Chinese Patent Application No. 201610104416.7 dated Mar. 26, 2018. 3 pages.
Office Action on Chinese Patent Application No. 201610107795.5 dated Mar. 28, 2018. 14 pages.
Office Action on U.S. Appl. No. 14/717,593 dated May 2, 2018. 11 pages.
Notice of Allowance on U.S. Appl. No. 14/634,609 dated Aug. 29, 2018. 8 pages.

\* cited by examiner

Chiller 1 | Chiller 2 | Chiller 3 | Chiller 4

Chiller 1 | Chiller 2 | Chiller 3 | Chiller 4

Chiller 1 | Chiller 2 | Chiller 3 | Chiller 4

Chiller 1 | Chiller 2 | Chiller 3 | Chiller 4

LOW LEVEL CENTRAL PLANT OPTIMIZATION

CROSS-REFERENCE TO RELATED PATENT APPLICATIONS

This application claims the benefit of and priority to U.S. Provisional Patent Application No. 61/987,361 filed May 1, 2014, the entirety of which is incorporated by reference herein.

BACKGROUND

The present disclosure relates generally to the operation of a central plant for serving building thermal energy loads. The present disclosure relates more particularly to systems and methods for optimizing the operation of one or more subplants of a central plant.

A central plant may include various types of equipment configured to serve the thermal energy loads of a building or building campus (i.e., a system of buildings). For example, a central plant may include heaters, chillers, heat recovery chillers, cooling towers, or other types of equipment configured to provide heating or cooling for the building. Some central plants include thermal energy storage configured to store the thermal energy produced by the central plant for later use.

A central plant may consume resources from a utility (e.g., electricity, water, natural gas, etc.) to heat or cool a working fluid (e.g., water, glycol, etc.) that is circulated to the building or stored for later use to provide heating or cooling for the building. Fluid conduits typically deliver the heated or chilled fluid to air handlers located on the rooftop of the building or to individual floors or zones of the building. The air handlers push air past heat exchangers (e.g., heating coils or cooling coils) through which the working fluid flows to provide heating or cooling for the air. The working fluid then returns to the central plant to receive further heating or cooling and the cycle continues.

As variables such as temperature and humidity vary, the central plant may cycle on or off multiple chillers, heaters, pumps, or cooling towers to provide the varying thermal energy loads of the building. High efficiency equipment can help reduce the amount of energy consumed by the central plant. However, the effectiveness of such equipment is highly dependent on the control technology that is used. It is challenging and difficult to efficiently control a central plant for a building.

SUMMARY

One implementation of the present disclosure is a controller for a central plant. The central plant has a plurality of subplants that serve thermal energy loads of a building or building system. The controller includes a processing circuit having a processor and memory. The processing circuit is configured to identify a thermal energy load setpoint for a subplant of the central plant. The processing circuit includes a binary optimization module configured to use binary optimization to determine one or more feasible on/off configurations for equipment of the subplant based on the identified thermal energy load setpoint, a setpoint evaluator module configured to determine optimum operating setpoints for the subplant equipment for each feasible on/off configuration, and a subplant control module configured to generate operating parameters for the subplant equipment. The generated operating parameters include at least one of the feasible on/off configurations and the optimum operating setpoints. The controller further includes a communications interface coupled to the processing circuit and configured to output the generated operating parameters for use in controlling the subplant equipment.

In some embodiments, the controller further includes a constraints evaluator module configured to identify applicable constraints for the subplant equipment. Each feasible on/off configuration may satisfy the applicable constraints and may be estimated to result in the subplant equipment meeting the thermal energy load setpoint.

In some embodiments, the binary optimization module uses a branch and bound method to determine the one or more feasible on/off configurations.

In some embodiments, the setpoint evaluator module determines the optimum operating setpoints using a nonlinear optimization that minimizes an amount of power consumed by the subplant equipment.

In some embodiments, the setpoint evaluator module is configured to estimate an amount of power consumed by each feasible on/off configuration of the subplant equipment at the optimum operating setpoints and to identify which of the feasible on/off configurations is estimated to result in a lowest amount of power consumed by the subplant equipment at the optimum operating setpoints.

In some embodiments, identifying the thermal energy load setpoint includes receiving the thermal energy load setpoint from a high level optimization that uses a predicted thermal energy load for the building to determine optimum thermal energy load setpoints for the plurality of subplants.

In some embodiments, the processing circuit includes a low level optimization module configured to generate a resource consumption curve for the subplant. The resource consumption curve may indicate a minimum amount of resource consumption by the subplant as a function of a thermal energy load on the subplant.

Another implementation of the present disclosure is a method for controlling a central plant. The central plant has a plurality of subplants that serve thermal energy loads of a building or building system. The method includes identifying, by a processing circuit of a controller for the central plant, a thermal energy load setpoint for a subplant of the central plant and using, by a binary optimization module of the processing circuit, binary optimization to determine one or more feasible on/off configurations for equipment of the subplant based on the identified thermal energy load setpoint. The method further includes determining, by a setpoint evaluator module of the processing circuit, optimum operating setpoints for the subplant equipment for each feasible on/off configuration and generating, by a subplant control module of the processing circuit, operating parameters for the subplant equipment. The operating parameters include at least one of the feasible on/off configurations and the optimum operating setpoints. The method further includes outputting the generated operating parameters via a communications interface coupled to the processing circuit for use in controlling the subplant equipment.

In some embodiments, the method includes identifying applicable constraints for the subplant equipment. Each feasible on/off configuration may satisfy the applicable constraints and is estimated to result in the subplant equipment meeting the thermal energy load setpoint.

In some embodiments, determining the one or more feasible on/off configurations includes using a branch and bound method.

In some embodiments, determining the optimum operating setpoints includes using a nonlinear optimization that minimizes an amount of power consumed by the subplant equipment.

In some embodiments, the method includes estimating an amount of power consumed by each feasible on/off configuration of the subplant equipment at the optimum operating setpoints and identifying which of the feasible on/off configurations is estimated to result in a lowest amount of power consumed by the subplant equipment at the optimum operating setpoints.

In some embodiments, identifying the thermal energy load setpoint includes receiving the thermal energy load setpoint from a high level optimization that uses a predicted thermal energy load for the building to determine optimum thermal energy load setpoints for the plurality of subplants.

In some embodiments, the method includes generating a resource consumption curve for the subplant. The resource consumption curve may indicate a minimum amount of resource consumption by the subplant as a function of a thermal energy load on the subplant.

Another implementation of the present disclosure is a method for determining optimum operating parameters for equipment of a central plant that serves thermal energy loads of a building or building system. The method may be performed by a controller for the central plant. The method includes initializing a database of possible solutions and a database of feasible solutions and retrieving a branch from the database of possible solutions. The retrieved branch includes a specified operating status for one or more devices of the central plant equipment. The method further includes determining whether the branch satisfies applicable constraints for the central plant equipment using the specified operating status and adding the branch to the database of feasible solutions in response to a determination that the branch satisfies the applicable constraints. The method further includes generating operating parameters for the central plant equipment. The operating parameters include the operating status specified by the branch in the database of feasible solutions.

In some embodiments, the branch includes a specified operating status for a first device of the central plant equipment and an unspecified operating status for a second device of the central plant equipment.

In some embodiments, the method further includes creating a first expanded branch by specifying a first operating status for the second device. The determining, adding, and generating steps may be performed for the first expanded branch. The method may further include creating a second expanded branch by specifying a second operating status for the second device and adding the second expanded branch to the database of possible solutions for evaluation in a subsequent iteration of the method.

In some embodiments, the method further includes, in response to a determination that the first expanded branch does not satisfy the applicable constraints, determining whether the first expanded branch can possibly satisfy the applicable constraints if an unspecified operating status in the first expanded branch is subsequently specified and adding the first expanded branch to the database of possible solutions for evaluation in a subsequent iteration of the method in response to a determination that the first expanded branch can possibly satisfy the applicable constraints.

In some embodiments, the method further includes estimating an amount of power consumed by each branch in the database of possible solutions. Retrieving the branch from the database of possible solutions may include retrieving the branch with the lowest estimated power consumption.

In some embodiments, the method includes estimating an amount of power consumed by each branch in the database of feasible solutions. The generated operating parameters may include the operating status specified by the branch in the database of feasible solutions with the lowest estimated power consumption.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
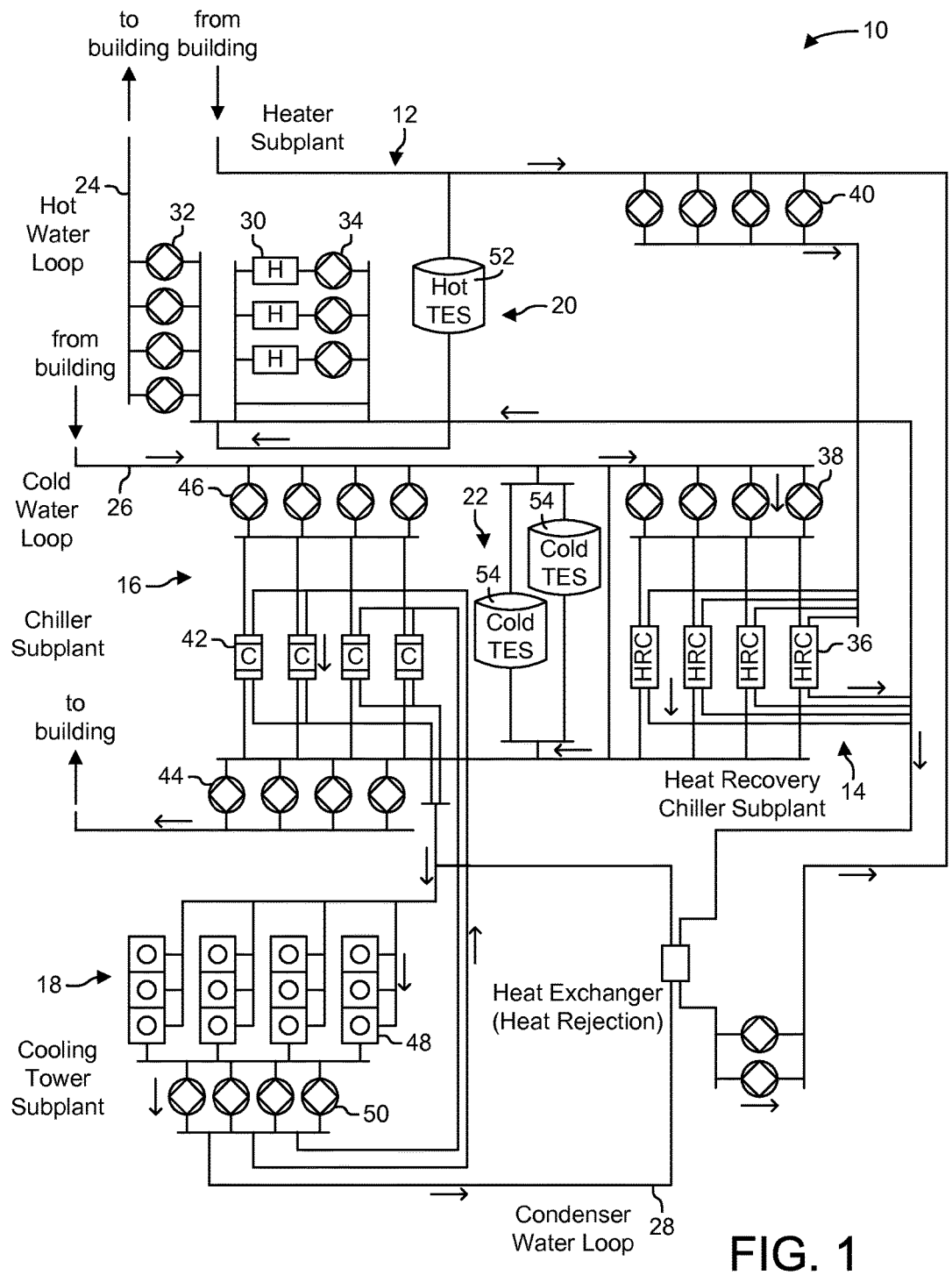
FIG. 1 is a diagram of a central plant including a plurality of subplants operable to serve the thermal energy loads of a building or building system, according to an exemplary embodiment.

Referring generally to the FIGURES, systems and methods for low level central plant optimization and are shown, according to various exemplary embodiments. The systems and methods described herein may be used to control the equipment of a central plant that provides heating and/or cooling for a building or building campus (i.e., a system of buildings). A central plant may include a plurality of subplants, each configured to perform a particular function. For example, a central plant may include a heater subplant, a chiller subplant, a heat recovery chiller subplant, a hot thermal energy storage subplant, a cold thermal energy storage subplant, etc.

According to an exemplary embodiment, each subplant receives a setpoint thermal energy load to be served by the subplant (e.g., a thermal energy per unit time) and generates equipment dispatch states and/or operational setpoints for various devices of the subplant to serve the setpoint thermal energy load. For example, each subplant may include a plurality of individual devices (e.g., heaters, chillers, pumps, valves, etc.) configured to facilitate the functions of the subplant. The equipment dispatch states may control which of the devices of the subplant are utilized to serve the thermal energy load (e.g., on/off states). The operational setpoints may determine individual setpoints for each active device of the subplant that is capable of operating at a variable capacity (e.g., operating a chiller at 10% capacity, 60% capacity, etc.).

The low level central plant optimization described herein may be used in conjunction with a high level central plant optimization. The high level optimization may determine an optimal distribution of thermal energy loads across multiple subplants of a central plant over a time horizon in order to minimize the cost of operating the central plant. For example, the high level optimization may determine an optimal subplant load $\dot{Q}_{subplant}$ for each subplant and provide the optimal subplant loads as setpoints to the various subplants. The low level optimization may be performed for each subplant. The low level optimization may determine which devices of the subplant to utilize (e.g., on/off states) and/or operating setpoints (e.g., temperature setpoints, flow setpoints, etc.) for individual devices of the subplant in order to minimize the amount of energy consumed by the subplant to serve the subplant load $\dot{Q}_{subplant}$.

In some embodiments, the low level optimization is performed for several different combinations of load and weather conditions to produce multiple data points (i.e., minimum energy consumption values for various subplant loads). A subplant curve can be fit to the low level optimization data for each subplant to determine the rate of utility usage (e.g., power consumption, resource consumption, etc.) as a function of the load served by the subplant. The high level optimization may use the subplant curves for a plurality of subplants to determine the optimal distribution of thermal energy loads across the subplants.

The low level optimization may use thermal models of the subplant equipment and/or the subplant network to determine the minimum energy consumption for a given thermal energy load. Equipment curves for individual devices or a combination of devices (e.g., thermal load v. resource consumption) may be used to determine an optimal selection of devices for a given load condition. For example, operating two chillers at 50% capacity may consume less energy than operating a single chiller at 100% capacity while producing the same thermal energy load. The equipment curves may determine optimal switching points for turning off or on individual devices. The thermal network may be used to establish the feasibility of a selection of equipment and may ensure that the required thermal energy load can be met. For example, the working capacity of one device may depend on the operating setpoints of other upstream, downstream, or component devices. The low level optimization may consider current operating conditions (e.g., weather conditions, environmental conditions, etc.) in determining the optimal selection of equipment and/or setpoints to serve a given thermal energy load.

In some embodiments, the low level optimization uses mixed binary optimization (e.g., branch and bound) and/or nonlinear optimization (e.g., sequential quadratic programming) to minimize the energy consumption of a subplant. Non-exhaustive binary optimization and the nonlinear optimization may both contribute to minimization of energy consumption. Binary optimization may be used to determine the optimal combination of equipment for meeting the subplant load $\dot{Q}_{subplant}$. Nonlinear optimization may be used to determine optimal operating setpoints (e.g., setpoints expected to result in minimum or near-minimum power consumption for a determined combination of equipment). A system or method of the present invention having mixed binary optimization and/or nonlinear optimization may advantageously result in lower central plant operating costs. In some embodiments, the mixed optimization may be advantageously suited for improving real time (i.e., near real time) optimization and automation of the central plant. The mixed optimization may also be implemented in a planning tool to predict the performance of the central plant for a future time period.

Referring now to FIG. 1, a diagram of a central plant 10 is shown, according to an exemplary embodiment. Central plant 10 is shown to include a plurality of subplants including a heater subplant 12, a heat recovery chiller subplant 14, a chiller subplant 16, a cooling tower subplant 18, a hot thermal energy storage (TES) subplant 20, and a cold thermal energy storage (TES) subplant 22. Subplants 12-22 consume resources (e.g., water, natural gas, electricity, etc.) from utilities to serve the thermal energy loads (e.g., hot water, cold water, heating, cooling, etc.) of a building or campus. For example, heater subplant 12 may be configured to heat water in a hot water loop 24 that circulates the hot water between central plant 10 and a building (not shown). Chiller subplant 16 may be configured to chill water in a cold water loop 26 that circulates the cold water between central plant 10 and the building. Heat recovery chiller subplant 14 may be configured to transfer heat from cold water loop 26 to hot water loop 24 to provide additional heating for the hot water and additional cooling for the cold water. Condenser water loop 28 may absorb heat from the cold water in chiller subplant 16 and reject the absorbed heat in cooling tower subplant 18 or transfer the absorbed heat to hot water loop 24. Hot TES subplant 20 and cold TES subplant 22 store hot and cold thermal energy, respectively, for subsequent use.

Hot water loop 24 and cold water loop 26 may deliver the heated and/or chilled water to air handlers located on the rooftop of a building or to individual floors or zones of the building. The air handlers push air past heat exchangers (e.g., heating coils or cooling coils) through which the water flows to provide heating or cooling for the air. The heated or cooled air may be delivered to individual zones of the building to serve the thermal energy loads of the building. The water then returns to central plant 10 to receive further heating or cooling in subplants 12-22.

Although central plant 10 is shown and described as heating and cooling water for circulation to a building, it is understood that any other type of working fluid (e.g., glycol, $CO_2$, etc.) may be used in place of or in addition to water to serve the thermal energy loads. In other embodiments, central plant 10 may provide heating and/or cooling directly to the building or campus without requiring an intermediate heat transfer fluid. Central plant 10 may be physically separate from a building served by subplants 12-22 or physically integrated with the building (e.g., located within the building).

Each of subplants 12-22 may include a variety of equipment configured to facilitate the functions of the subplant. For example, heater subplant 12 is shown to include a plurality of heating elements 30 (e.g., boilers, electric heaters, etc.) configured to add heat to the hot water in hot water loop 24. Heater subplant 12 is also shown to include several pumps 32 and 34 configured to circulate the hot water in hot water loop 24 and to control the flow rate of the hot water through individual heating elements 30. Heat recovery chiller subplant 14 is shown to include a plurality of heat recovery heat exchangers 36 (e.g., refrigeration circuits) configured to transfer heat from cold water loop 26 to hot water loop 24. Heat recovery chiller subplant 14 is also shown to include several pumps 38 and 40 configured to circulate the hot water and/or cold water through heat recovery heat exchangers 36 and to control the flow rate of the water through individual heat recovery heat exchangers 36.

Chiller subplant 16 is shown to include a plurality of chillers 42 configured to remove heat from the cold water in cold water loop 26. Chiller subplant 16 is also shown to include several pumps 44 and 46 configured to circulate the cold water in cold water loop 26 and to control the flow rate of the cold water through individual chillers 42. Cooling tower subplant 18 is shown to include a plurality of cooling towers 48 configured to remove heat from the condenser water in condenser water loop 28. Cooling tower subplant 18 is also shown to include several pumps 50 configured to circulate the condenser water in condenser water loop 28 and to control the flow rate of the condenser water through individual cooling towers 48.

Hot TES subplant 20 is shown to include a hot TES tank 52 configured to store the hot water for later use. Hot TES subplant 20 may also include one or more pumps or valves configured to control the flow rate of the hot water into or out of hot TES tank 52. Cold TES subplant 22 is shown to include cold TES tanks 54 configured to store the cold water for later use. Cold TES subplant 22 may also include one or more pumps or valves configured to control the flow rate of the cold water into or out of cold TES tanks 54. In some embodiments, one or more of the pumps in central plant 10 (e.g., pumps 32, 34, 38, 40, 44, 46, and/or 50) or pipelines in central plant 10 includes an isolation valve associated therewith. In various embodiments, isolation valves may be integrated with the pumps or positioned upstream or downstream of the pumps to control the fluid flows in central plant 10. In other embodiments, more, fewer, or different types of devices may be included in central plant 10.

Figure 2:
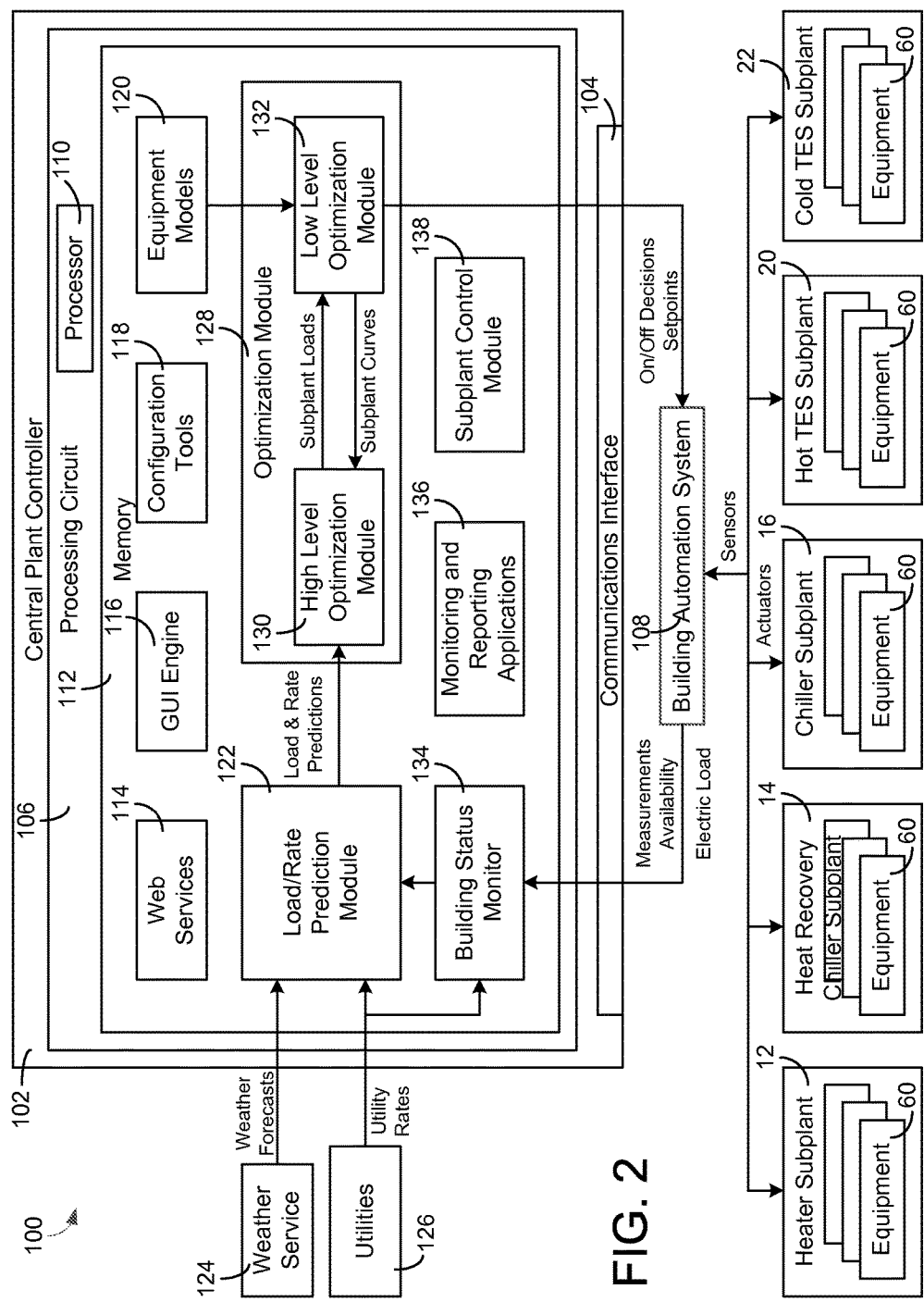
FIG. 2 is a block diagram of a central plant system including a central plant controller configured to generate on/off decisions and operating setpoints for equipment the central plant of FIG. 1, according to an exemplary embodiment.

Referring now to FIG. 2, a block diagram illustrating a central plant system 100 is shown, according to an exemplary embodiment. System 100 is shown to include a central plant controller 102, a building automation system 108, and a plurality of subplants 12-22. Subplants 12-22 may be the same as previously described with reference to FIG. 1. For example, subplants 12-22 are shown to include a heater subplant 12, a heat recovery chiller subplant 14, a chiller subplant 16, a hot TES subplant 20, and a cold TES subplant 22.

Each of subplants 12-22 is shown to include equipment 60 that can be controlled by central plant controller 102 and/or building automation system 108 to optimize the performance of central plant 10. Equipment 60 may include, for example, heating devices 30, chillers 42, heat recovery heat exchangers 36, cooling towers 48, thermal energy storage devices 52-54, pumps 32, 34, 38, 44, 46, 50, valves, and/or other devices of subplants 12-22. Individual devices of equipment 60 can be turned on or off to adjust the thermal energy load served by each of subplants 12-22. In some embodiments, individual devices of equipment 60 can be operated at variable capacities (e.g., operating a chiller at 10% capacity or 60% capacity) according to an operating setpoint received from central plant controller 102.

In some embodiments, one or more of subplants 12-22 includes a subplant level controller configured to control the equipment 60 of the corresponding subplant. For example, central plant controller 102 may determine an on/off configuration and global operating setpoints for equipment 60. In response to the on/off configuration and received global operating setpoints, the subplant controllers may turn individual devices of equipment 60 on or off, and implement specific operating setpoints (e.g., damper position, vane position, fan speed, pump speed, etc.) to reach or maintain the global operating setpoints.

Building automation system (BAS) 108 may be configured to monitor conditions within a controlled building. For example, BAS 108 may receive input from various sensors (e.g., temperature sensors, humidity sensors, airflow sensors, voltage sensors, etc.) distributed throughout the building and may report building conditions to central plant controller 102. Building conditions may include, for example, a temperature of the building or a zone of the building, a power consumption (e.g., electric load) of the building, a state of one or more actuators configured to affect a controlled state within the building, or other types of information relating to the controlled building. BAS 108 may operate subplants 12-22 to affect the monitored conditions within the building and to serve the thermal energy loads of the building.

BAS 108 may receive control signals from central plant controller 102 specifying on/off states and/or setpoints for equipment 60. BAS 108 may control equipment 60 (e.g., via actuators, power relays, etc.) in accordance with the control signals provided by central plant controller 102. For example, BAS 108 may operate equipment 60 using closed loop control to achieve the setpoints specified by central plant controller 102. In various embodiments, BAS 108 may be combined with central plant controller 102 or may be part of a separate building management system. According to an exemplary embodiment, BAS 108 is a METASYS® brand building management system, as sold by Johnson Controls, Inc.

Central plant controller 102 may monitor the status of the controlled building using information received from BAS 108. Central plant controller 102 may be configured to predict the thermal energy loads (e.g., heating loads, cooling loads, etc.) of the building for plurality of time steps in a prediction window (e.g., using weather forecasts from a weather service). Central plant controller 102 may generate on/off decisions and/or setpoints for equipment 60 to minimize the cost of energy consumed by subplants 12-22 to serve the predicted heating and/or cooling loads for the duration of the prediction window. Central plant controller 102 may be configured to carry out process 500 (FIG. 5), process 600 (FIG. 6), process 700 (FIG. 7), and other processes described herein. According to an exemplary embodiment, central plant controller 102 is integrated within a single computer (e.g., one server, one housing, etc.). In various other exemplary embodiments, central plant controller 102 can be distributed across multiple servers or computers (e.g., that can exist in distributed locations). In another exemplary embodiment, central plant controller 102 may integrated with a smart building manager that manages multiple building systems and/or combined with BAS 108.

Central plant controller 102 is shown to include a communications interface 104 and a processing circuit 106. Communications interface 104 may include wired or wireless interfaces (e.g., jacks, antennas, transmitters, receivers, transceivers, wire terminals, etc.) for conducting data communications with various systems, devices, or networks. For example, communications interface 104 may include an Ethernet card and port for sending and receiving data via an Ethernet-based communications network and/or a WiFi transceiver for communicating via a wireless communications network. Communications interface 104 may be configured to communicate via local area networks or wide area networks (e.g., the Internet, a building WAN, etc.) and may use a variety of communications protocols (e.g., BACnet, IP, LON, etc.).

Communications interface 104 may be a network interface configured to facilitate electronic data communications between central plant controller 102 and various external systems or devices (e.g., BAS 108, subplants 12-22, etc.). For example, central plant controller 102 may receive information from BAS 108 indicating one or more measured states of the controlled building (e.g., temperature, humidity, electric loads, etc.) and one or more states of subplants 12-22 (e.g., equipment status, power consumption, equipment availability, etc.). Communications interface 104 may receive inputs from BAS 108 and/or subplants 12-22 and may provide operating parameters (e.g., on/off decisions, setpoints, etc.) to subplants 12-22 via BAS 108. The operating parameters may cause subplants 12-22 to activate, deactivate, or adjust a setpoint for various devices of equipment 60.

Still referring to FIG. 2, processing circuit 106 is shown to include a processor 110 and memory 112. Processor 110 may be a general purpose or specific purpose processor, an application specific integrated circuit (ASIC), one or more field programmable gate arrays (FPGAs), a group of processing components, or other suitable processing components. Processor 110 may be configured to execute computer code or instructions stored in memory 112 or received from other computer readable media (e.g., CDROM, network storage, a remote server, etc.).

Memory 112 may include one or more devices (e.g., memory units, memory devices, storage devices, etc.) for storing data and/or computer code for completing and/or facilitating the various processes described in the present disclosure. Memory 112 may include random access memory (RAM), read-only memory (ROM), hard drive storage, temporary storage, non-volatile memory, flash memory, optical memory, or any other suitable memory for storing software objects and/or computer instructions. Memory 112 may include database components, object code components, script components, or any other type of information structure for supporting the various activities and information structures described in the present disclosure. Memory 112 may be communicably connected to processor 110 via processing circuit 106 and may include computer code for executing (e.g., by processor 106) one or more processes described herein.

Still referring to FIG. 2, memory 112 is shown to include a building status monitor 134. Central plant controller 102 may receive data regarding the overall building or building space to be heated or cooled with central plant 10 via building status monitor 134. In an exemplary embodiment, building status monitor 134 may include a graphical user interface component configured to provide graphical user interfaces to a user for selecting building requirements (e.g., overall temperature parameters, selecting schedules for the building, selecting different temperature levels for different building zones, etc.).

Central plant controller 102 may determine on/off configurations and operating setpoints to satisfy the building requirements received from building status monitor 134. In some embodiments, building status monitor 134 receives, collects, stores, and/or transmits cooling load requirements, building temperature setpoints, occupancy data, weather data, energy data, schedule data, and other building parameters. In some embodiments, building status monitor 134 stores data regarding energy costs, such as pricing information available from utilities 126 (energy charge, demand charge, etc.).

Still referring to FIG. 2, memory 112 is shown to include a load/rate prediction module 122. Load/rate prediction module 122 may be configured to predict the thermal energy loads ($\hat{l}_k$) of the building or campus for each time step k (e.g., k=1 . . . n) of a prediction period. Load/rate prediction module 122 is shown receiving weather forecasts from a weather service 124. In some embodiments, load/rate prediction module 122 predicts the thermal energy loads $\hat{l}_k$ as a function of the weather forecasts. In some embodiments, load/rate prediction module 122 uses feedback from BAS 108 to predict loads $\hat{l}_k$. Feedback from BAS 108 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate prediction module 122 receives a measured electric load and/or previous measured load data from BAS 108 (e.g., via building status monitor 134). Load/rate prediction module 122 may predict loads $\hat{l}_k$ as a function of a given weather forecast ($\hat{\phi}_w$), a day type (day), the time of day (t), and previous measured load data ($Y_{k-1}$). Such a relationship is expressed in the following equation:

$$\hat{l}_k = f(\hat{\phi}_w, \text{day}, t | Y_{k-1})$$

In some embodiments, load/rate prediction module 122 uses a deterministic plus stochastic model trained from historical load data to predict loads $\hat{l}_k$. Load/rate prediction module 122 may use any of a variety of prediction methods to predict loads $\hat{l}_k$ (e.g., linear regression for the deterministic portion and an AR model for the stochastic portion).

Load/rate prediction module 122 is shown receiving utility rates from utilities 126. Utility rates may indicate a cost or price per unit of a resource (e.g., electricity, natural gas, water, etc.) provided by utilities 126 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 126 or predicted utility rates estimated by load/rate prediction module 122.

In some embodiments, the utility rates include demand charge rates for one or more resources provided by utilities 126. A demand charge may define a separate cost imposed by utilities 126 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, optimization module 128 may be configured to account for demand charges in the high level optimization process performed by high level optimization module 130.

Load/rate prediction module 122 may store the predicted loads $\hat{l}_k$ and the utility rates in memory 112 and/or provide the predicted loads $\hat{l}_k$ and the utility rates to optimization module 128. Optimization module 128 may use the predicted loads $\hat{l}_k$ and the utility rates to determine an optimal load distribution for subplants 12-22 and to generate on/off decisions and setpoints for equipment 60.

Still referring to FIG. 2, memory 112 is shown to include an optimization module 128. Optimization module 128 may perform a cascaded optimization process to optimize the performance of central plant 10. For example, optimization module 128 is shown to include a high level optimization module 130 and a low level optimization module 132. High level optimization module 130 may determine how to distribute thermal energy loads across subplants 12-22 for each time step in the prediction window in order to minimize the cost of energy consumed by subplants 12-22. Low level optimization module 132 may determine how to best run each subplant at the load setpoint determined by high level optimization module 130.

Advantageously, the cascaded optimization process performed by optimization module 128 allows the optimization process to be performed in a time-efficient manner. The low level optimization may use a relatively short time horizon or no time horizon at all due to the fast system dynamics compared to the time to re-optimize plant loads. The high level optimization may use a relatively longer time horizon when the dynamics and capacity of the thermal energy storage allow loads to be deferred for long time periods.

Low level optimization module 132 may generate and provide subplant power curves to high level optimization module 130. The subplant power curves may indicate the rate of utility use by each of subplants 12-22 (e.g., measured in units of power such as kW) as a function of the load served by the subplant. In some embodiments, low level optimization module 132 generates the subplant power curves based on equipment models 120 (e.g., by combining equipment models 120 for individual devices into an aggregate power curve for the subplant). Low level optimization module 132 may generate the subplant power curves by running the low level optimization process (described in greater detail with reference to FIGS. 5-7) for several different loads and weather conditions to generate multiple data points ($\dot{Q}_{subplant}$, kW). Low level optimization module 132 may fit a curve to the data points to generate the subplant power curves.

High level optimization module 130 may receive the load and rate predictions from load/rate prediction module 122 and the subplant power curves from low level optimization module 132. High level optimization module 130 may determine the optimal load distribution for subplants 12-22 (e.g., $\dot{Q}_{subplant}$ for each subplant) over the prediction window and provide the optimal load distribution to low level optimization module 132. In some embodiments, high level optimization module 130 determines the optimal load distribution by minimizing the total operating cost of central plant 10 over the prediction window. In other words, given a predicted load $\hat{l}_k$ and utility rate information from load/rate prediction module 122, high level optimization module 130 may distribute the predicted load $\hat{l}_k$ across subplants 12-22 to minimize cost.

In some instances, the optimal load distribution may include using TES subplants 20 and/or 22 to store thermal energy during a first time step for use during a later time step. Thermal energy storage may advantageously allow thermal energy to be produced and stored during a first time period when energy prices are relatively low and subsequently retrieved and used during a second time period when energy proves are relatively high. The high level optimization may be different from the low level optimization in that the high level optimization has a longer time constant due to the thermal energy storage provided by TES subplants 20-22. The high level optimization may be described by the following equation:

$$\theta_{HL}^* = \underset{\theta_{HL}}{\mathrm{argmin}}\, J_{HL}(\theta_{HL})$$

where $\theta^*_{HL}$ contains the optimal high level decisions (e.g., the optimal load $\dot{Q}$ for each of subplants 12-22) for the entire prediction period and $J_{HL}$ is the high level cost function.

To find the optimal high level decisions $\theta^*_{HL}$, high level optimization module 132 may minimize the high level cost function $J_{HL}$. The high level cost function $J_{HL}$ may be the sum of the economic costs of each utility consumed by each of subplants 12-22 for the duration of the prediction period. For example, the high level cost function $J_{HL}$ may be described using the following equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right]$$

where $n_h$ is the number of time steps k in the prediction period, $n_s$ is the number of subplants, $t_s$ is the duration of a time step, $c_{jk}$ is the economic cost of utility j at a time step k of the prediction period, and $u_{jik}$ is the rate of use of utility j by subplant i at time step k. In some embodiments, the cost function $J_{HL}$ includes an additional demand charge term such as:

$$w_d c_{demand} \underset{n_h}{\max}(u_{elec}(\theta_{HL}), u_{max,elec})$$

where $w_d$ is a weighting term, $c_{demand}$ is the demand cost, and the max( ) term selects the peak electricity use during the applicable demand charge period.

In some embodiments, the high level optimization performed by high level optimization module 130 is the same or similar to the high level optimization process described in U.S. patent application Ser. No. 14/634,609 titled "High Level Central Plant Optimization" and filed on the same day as the present application Feb. 27, 2015. The entire disclosure of U.S. patent application Ser. No. 14/634,609 is incorporated by reference herein.

In some embodiments, high level optimization module 130 provides the optimal load distribution for each time step to low level optimization module 132 at the beginning of the time step. The optimal load distributions for subsequent time steps may be updated by high level optimization module 130 and provided to low level optimization module 132 at the beginning of subsequent time steps.

Low level optimization module 132 may use the subplant loads determined by high level optimization module 130 to determine optimal low level decisions $\theta^*_{LL}$ (e.g. binary on/off decisions, flow setpoints, temperature setpoints, etc.) for equipment 60. The low level optimization process may be performed for each of subplants 12-22. Low level optimization module 132 may be responsible for determining which devices of each subplant to use and the setpoints for such devices that will achieve the subplant load setpoint while minimizing energy consumption. The low level optimization may be described using the following equation:

$$\theta^*_{LL} = \underset{\theta_{LL}}{\operatorname{argmin}} J_{LL}(\theta_{LL})$$

where $\theta^*_{LL}$ contains the optimal low level decisions and $J_{LL}$ is the low level cost function.

To find the optimal low level decisions $\theta^*_{LL}$, low level optimization module 132 may minimize the low level cost function $J_{LL}$. The low level cost function $J_{LL}$ may represent the total energy consumption for all of the devices of equipment 60 in the applicable subplant. The lower level cost function $J_{LL}$ may be described using the following equation:

$$J_{LL}(\theta_{LL}) = \sum_{j=1}^{N} t_s \cdot b_j \cdot u_j(\theta_{LL})$$

where N is the number of devices of equipment 60 in the subplant, $t_s$ is the duration of a time step, $b_j$ is a binary on/off decision (e.g., 0=off, 1=on), and $u_j$ is the energy used by device j as a function of the setpoint $\theta_{LL}$. Each device may have continuous variables which can be changed to determine the lowest possible energy consumption for the overall input conditions.

Low level optimization module 132 may minimize the low level cost function $J_{LL}$ subject to inequality constraints based on the capacities of equipment 60 and equality constraints based on energy and mass balances. In some embodiments, the optimal low level decisions $\theta^*_{LL}$ are constrained by switching constraints defining a short horizon for maintaining a device in an on or off state after a binary on/off switch. The switching constraints may prevent devices from being rapidly cycled on and off. In some embodiments, low level optimization module 132 performs the equipment level optimization without considering system dynamics. The optimization process may be slow enough to safely assume that the equipment control has reached its steady-state. Thus, low level optimization module 132 may determine the optimal low level decisions $\theta^*_{LL}$ at an instance of time rather than over a long horizon.

Low level optimization module 132 may determine optimum operating statuses (e.g., on or off) for a plurality of devices of equipment 60. Low level optimization module 132 may store code executable by processor 110 to execute operations as subsequently described in this application, including binary optimization operations and/or quadratic compensation operations. According to an exemplary embodiment, the on/off combinations may be determined using binary optimization and quadratic compensation. Binary optimization may minimize a cost function representing the power consumption of devices in the applicable subplant. In some embodiments, non-exhaustive (i.e., not all potential combinations of devices are considered) binary optimization is used. Quadratic compensation may be used in considering devices whose power consumption is quadratic (and not linear). Low level optimization module 132 may also determine optimum operating setpoints for equipment using nonlinear optimization. Nonlinear optimization may identify operating setpoints that further minimize the low level cost function $J_{LL}$. Low level optimization module 132 is described in greater detail with reference to FIG. 3.

Still referring to FIG. 2, memory 112 is shown to include a subplant control module 138. Subplant control module 138 may store historical data regarding past operating statuses, past operating setpoints, and instructions for calculating and/or implementing control parameters for subplants 12-22. Subplant control module 138 may also receive, store, and/or transmit data regarding the conditions of individual devices of equipment 60, such as operating efficiency, equipment degradation, a date since last service, a lifespan parameter, a condition grade, or other device-specific data. Subplant control module 138 may receive data from subplants 12-22 and/or BAS 108 via communications interface 104. Subplant control module 138 may also receive and store on/off statuses and operating setpoints from low level optimization module 132.

Data and processing results from optimization module 128, subplant control module 138, or other modules of central plant controller 102 may be accessed by (or pushed to) monitoring and reporting applications 136. Monitoring and reporting applications 136 may be configured to generate real time "system health" dashboards that can be viewed and navigated by a user (e.g., a central plant engineer). For example, monitoring and reporting applications 136 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across central plants in different buildings (real or modeled), different campuses, or the like. Other GUI elements or reports may be generated and shown based on available data that allow users to assess performance across one or more central plants from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of a chilled water system.

Still referring to FIG. 2, central plant controller 102 may include one or more GUI servers, web services 114, or GUI engines 116 to support monitoring and reporting applications 136. In various embodiments, applications 136, web services 114, and GUI engine 116 may be provided as separate components outside of central plant controller 102 (e.g., as part of a smart building manager). Central plant controller 102 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Central plant controller 102 may be configured to provide the results of any such processing to other databases, tables, XML files, or other data structures for further querying, calculation, or access by, for example, external monitoring and reporting applications.

Central plant controller 102 is shown to include configuration tools 118. Configuration tools 118 can allow a user to define (e.g., via graphical user interfaces, via prompt-driven "wizards," etc.) how central plant controller 102 should react to changing conditions in the central plant subsystems. In an exemplary embodiment, configuration tools 118 allow a user to build and store condition-response scenarios that can cross multiple central plant devices, multiple building systems, and multiple enterprise control applications (e.g., work order management system applications, entity resource planning applications, etc.). For example, configuration tools 118 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 118 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Figure 3:
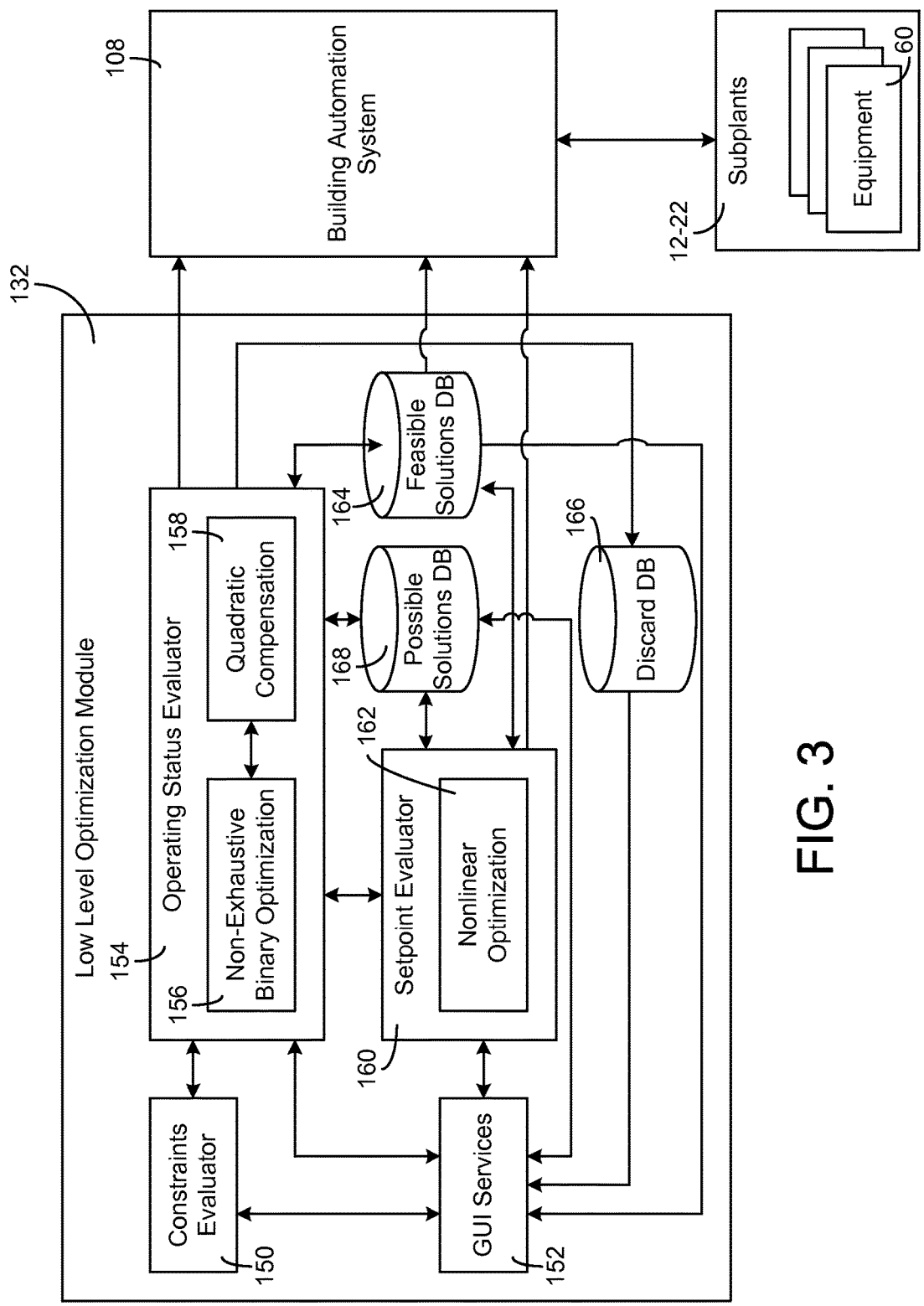
FIG. 3 is a block diagram illustrating a low level optimization module of the central plant controller of FIG. 2 in greater detail, according to an exemplary embodiment.

Referring now to FIG. 3, a block diagram illustrating low level optimization module 132 in greater detail is shown, according to an exemplary embodiment. Low level optimization module 132 may store computer code (e.g., a set of executable computer code instructions stored in non-transitory computer-readable media) that is executable by processor 110. Low level optimization module 132 may be configured to generate and output operating status commands and setpoints for equipment 60 via, e.g., communications interface 104. The operating status commands (e.g., on/off) and setpoints output to the equipment 60 of a particular subplant may be estimated (e.g., by low level optimization module 132) to minimize the power consumption of the subplant.

Low level optimization module 132 is shown to include an operating status evaluator 154. Operating status evaluator 154 may examine a plurality of potential device on/off combinations to select a combination for use by central plant 10. For example, if chiller subplant 16 has four chillers (i.e., chiller 1, chiller 2, chiller 3, and chiller 4), a potential on/off combination may be [1, 0, 0, 1] indicating that chiller 1 is on, chiller 2 is off, chiller 3 is off, and chiller 4 is on. In some instances, the operating status of a particular device may be unspecified (e.g., corresponding to a node that has not yet been evaluated) and may be represented with a question mark. For example, the combination [1, 0, ?, ?] may indicate that chiller 1 is on, chiller 2 is off, and chillers 3-4 have an unspecified operating status. An unspecified operating status does not necessarily indicate that the operating status is unknown, but rather that the operating status for the corresponding device has not yet been evaluated and is not fixed by the combination. For example, the combination [1, 0, 0, ?] fixes the operating status of chiller 1, chiller 2, and chiller 3, but indicates that it is possible for chiller 4 to be either on or off and still satisfy the combination. In an exemplary embodiment, operating status evaluator 154 uses non-exhaustive binary optimization and quadratic compensation to determine which combination of on/off states to select for use. Modules 156 and 158 (described in greater detail below) provide instructions for implementing the non-exhaustive binary optimization and quadratic compensation, respectively.

Low level optimization module 132 is shown to include possible solutions database 168, a feasible solution database 164, and discard database 166. Possible solutions database 168 may contain on/off combinations that are estimated to be capable of satisfying the thermal energy load and the optimization constraints for the subplant. A combination may be stored in possible solutions database if the combination can potentially satisfy all of the applicable constraints (e.g., subplant load constraints, device capacity constraints, etc.), considering any unspecified operating statuses as wildcards. For example, if the combination [1, 1, 0, 1] satisfies the constraints but the combination [1, 1, 0, 0] does not, the combination [1, 1, 0, ?] would satisfy the constraints because the unspecified operating status can be either on (1) or off (0). Possible solutions database 168 stores possible combinations (i.e., combinations that satisfy plant load requirements and system constraints) that may or may not result in the lowest power consumption.

Discard database 166 may contain combinations currently known or estimated to be unable to satisfy subplant load and/or system constraint requirements. Discard database 166 may store infeasible combinations of devices (i.e., combinations that cannot possibly satisfy plant load requirements and/or system constraints) regardless of the operating statuses of any devices with an unspecified operating status. For example, if both of the combinations [1, 1, 0, 1] and [1, 1, 0, 0] fail to satisfy the constraints, the combination [1, 1, 0, ?] would also fail to satisfy the constraints because no value of the unspecified operating status would cause the combination to satisfy the constraints.

Feasible solutions database 164 may contain potential combinations that are capable of satisfying the subplant load and system constraint requirements, and additionally do so with a minimum energy consumption. In some embodiments, feasible solutions database 164 stores the optimal combination of on/off statuses (i.e., the combination that results in the minimum energy consumption). In some embodiments, feasible solutions database 164 stores combinations that satisfy all applicable constraints, regardless of the value of any unspecified operating status. For example, if both of the combinations [1, 1, 0, 1] and [1, 1, 0, 0] satisfy the constraints, the combination [1, 1, 0, ?] may be stored as a feasible combination because any value of the unspecified operating status would cause the combination to satisfy the constraints. Databases 164, 166, and 168 may store the potential combinations in any suitable data structure or data structures, including linked lists, trees, arrays, relational database structures, object-based structures, or other data structures.

Operating status evaluator 154 may receive possible combinations of on/off statuses from possible solutions database 168. Operating status evaluator 154 may evaluate the combinations in possible solutions database 168 in view of the currently applicable constraints (e.g., subplant load, device capacities, etc.) and store various combinations in possible solutions database 168, feasible solutions database 164, and/or discard database 166 based on a result of the evaluation. In some embodiments, operating status evaluator 154 periodically evaluates new combinations (e.g., those which have not recently been evaluated as a potentially optimal solution) from feasible solutions database 164 and/or discard database 166 for further evaluation. Moreover, as new devices are brought online, such new devices and new combinations including the new devices can be added to feasible solutions database 164 for consideration by operating status evaluator 154.

Operating status evaluator 154 may receive constraints on the low level optimization process from constraints evaluator 150. Constraints may include, for example, maximum device capacities, energy or mass balance constraints, minimum device capacities, etc. The constraints may establish minimum and/or maximum parameters for equipment 60. In some embodiments, the constraints are automatically generated quantities based on, e.g., historical data. In other embodiments, an operator of the central plant system may set and/or modify the constraints. The constraints include, for example, that each device of the subplant system operate with a minimum load (such as 30%). This requirement may advantageously ensure that power is being consumed efficiently (i.e., the work done by the device is sufficient to justify the power required to operate the device). The constraints may also include that the total power of the chiller plant be less than a maximum. This requirement may advantageously prevent the subplant from becoming overloaded.

Operating status evaluator 154 may use the constraints to identify feasible on/off configurations. Operating status evaluator 154 may provide a potential on/off combination to constraint evaluator 150, which may be configured to check the potential combination relative to the current constraints. If a potential combination cannot meet the current constraints, operating status evaluator 154 may move the potential combination to discard database 166 and/or remove the potential combination from feasible solutions database 164.

Still referring to FIG. 3, operating status evaluator 154 is shown to include a non-exhaustive binary optimization module 156 and a quadratic compensation module 158. Binary optimization module 156 may include computer code instructions for optimizing (e.g., minimizing) the low level cost function $J_{LL}$ representing the energy consumption of a subplant. According to an exemplary embodiment, binary optimization module 156 uses a branch and bound method to perform the binary optimization. The binary optimization process is described in greater detail in the discussion of FIG. 7. In some embodiments, binary optimization module 156 executes the branch and bound method such that not all of the possible combinations of equipment 50 are considered in any given situation. This may advantageously reduce computation time required by operating status evaluator 154.

Quadratic compensation module 158 may include computer code instructions configured to compensate for the nonlinear nature of the system. For example, quadratic compensation module 158 may account for the power consumption of some devices of equipment 60 having a quadratic form (i.e., not a linear form). Quadratic compensation module 158 may be selectively utilized when the power consumption of the devices being considered by operating status evaluator 154 is quadratic.

Quadratic compensation module 158 may advantageously account for the fact that the binary optimization performed by non-exhaustive binary optimization module 156 is intended for a linear system, but the power consumption of a particular device is a quadratic function. For example, in a purely linear system, binary optimization will typically return the fewest devices required to meet plant load. If turning two devices on will meet the plant load, then other combinations may not be considered, even if the power consumption of other combinations is lower. In an exemplary embodiment, however, alternative embodiments are identified and then compared using the assistance of quadratic compensation module 158 (or another nonlinear compensation).

Because chiller power is not linear, quadratic compensation may be conducted on every device having a nonlinear or quadratic power curve, advantageously checking for whether the lowest power combination of devices is achieved by adding another device. For example, binary optimization module 156 may identify a combination of devices that meets plant load (e.g., two devices on). The binary search may continue by looking ahead to a combination with the next device activated rather than deactivated. For example, even if two devices turned on would meet a plant load, the binary search may use each device's quadratic power curve to consider the expected power change with three devices turned on. The power consumption per device may decrease as additional devices are turned on because one or more of the devices may operate more efficiently at a lower capacity than a higher capacity. The net power consumption may therefore decrease as a result. If three devices on results in lower power, then it is a more optimal solution than two devices on. On the other hand, despite efficiencies gained in the original "on" devices by turning another device on, the overhead energy consumption added by turning on the additional device may result in a determination that the additional device should not be turned on.

Still referring to FIG. 3, low level optimization module 132 is shown to include a setpoint evaluator 160. Setpoint evaluator 160 may be configured to examine one or more combinations of active (e.g., "on") devices to determine optimal operating setpoints. The optimal operating setpoints may be estimated to minimize power consumption while achieving the subplant load setpoint and satisfying other constraints on the low level optimization process. According to an exemplary embodiment, setpoint evaluator 160 estimates the optimal temperature setpoints (e.g., hot water temperature setpoint, condenser water temperature setpoint, chilled water temperature setpoint, etc.), flow rate setpoints (e.g., flow rates through individual heating elements 30, chillers 42, heat recovery chillers 36, cooling towers 48, etc.), and/or pressure setpoints (e.g., hot water differential pressure, chilled water differential pressure, etc.) for a given combination of active devices of equipment 60. In other embodiments, more, fewer, or different setpoints may be determined.

Setpoint evaluator 160 may receive one or more potential on/off combinations from operating status evaluator 154 and/or possible solutions database 168. Setpoint evaluator 160 may move potential combinations to discard database 166 when the combinations are determined to be infeasible or when a potential combination is repeatedly identified as not being efficient relative to other solutions. In certain situations, setpoint evaluator 160 may also move potential combinations to feasible solutions database 164 (e.g., when a combination is estimated to minimize power consumption compared to other combinations).

Still referring to FIG. 3, setpoint evaluator 160 is shown to include a nonlinear optimization module 162. Nonlinear optimization module 162 may include computer code for optimizing (e.g., minimizing) the low level cost function $J_{LL}$ for a set of active central plant devices (e.g., devices that are "on"). The operating status (e.g., on/off) of the devices may have been previously determined using operating status evaluator 154. According to various embodiments, nonlinear optimization module 162 performs a nonlinear optimization using direct or indirect search methods. For example, nonlinear optimization module 162 may use a Nelder-Mead or downhill simplex method, Generalized Reduced Gradient (GRG), Sequential Quadratic Programming (SQP), Steepest Descent (Cauchy Method), Conjugate Gradient (Fletcher-Reeves Method), or other nonlinear optimization methods.

Low level optimization module 132 is shown to include GUI services 152. GUI services 152 may be configured to generate graphical user interfaces for central plant controller 102 or another server to provide to a user output device (e.g., a display, a mobile phone, a client computer, etc.). The graphical user interfaces may present or explain the active combination of devices, system efficiencies, system setpoints, system constraints, or other system information. GUI services 152 may facilitate a user's (e.g., a central plant engineer's) ability to track energy usage and operating statuses of the central plant devices via, e.g., a web-based monitoring application. GUI services 152 may additionally allow a user to manually set and update system constraints, available devices, certain thresholds (e.g., for moving a combination to a discard set) optimum off/on operating statuses, and optimum operating setpoints.

Figure 4:
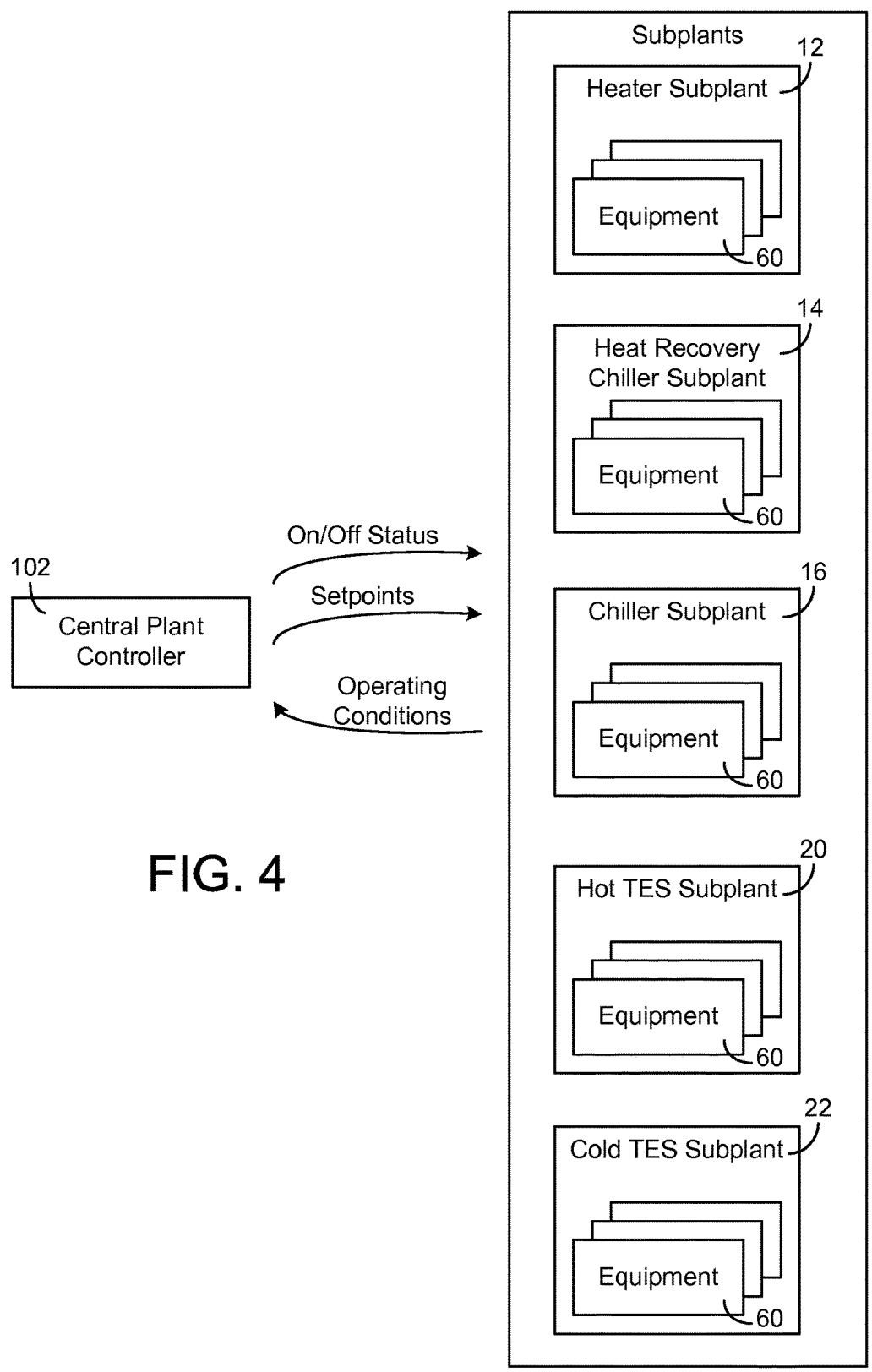
FIG. 4 is a block diagram illustrating the central plant controller of FIG. 2 receiving operating conditions from the plurality of subplants of FIG. 1 and providing generated on/off statuses and operating setpoints as operating commands for the central plant equipment, according to an exemplary embodiment.

Referring now to FIG. 4, a block diagram illustrating central plant controller 102 and subplants 12-22 is shown, according to an exemplary embodiment. Central plant controller 102 is configured to transmit determined on/off statuses and operating setpoints to subplants 12-22 and/or the equipment 60 within each subplant. Communication between central plant controller 102 and equipment 60 may be direct (as shown in FIG. 4) or via one or more intermediaries (e.g., BAS 108, subplant level controllers, etc.). Central plant controller 102 and subplants 12-22 may transmit and receive data automatically, without a user's intervention. In other embodiments, a user may additionally provide manual inputs or approvals to central plant controller 102 and/or subplants 12-22.

The number of active devices of equipment 60 within each subplant may depend on the load on the subplant. In some embodiments, equipment 60 may be coupled to a local controller that receives and implements the operating statuses and setpoints from central plant controller 102. The local controller may be configured to transmit operating conditions about equipment 60 back to central plant controller 102. For example, a local controller for a particular device may report or confirm current operating status (on/off), current operating load, device energy consumption, device on/run time, device operating efficiency, failure status, or other information back to central plant controller 102 for processing or storage. The performance of equipment 60 may be evaluated using a coefficient of performance (COP), a power consumption per plant load (KW/ton) value, or another value indicative of power efficiency or consumption.

Figure 5:
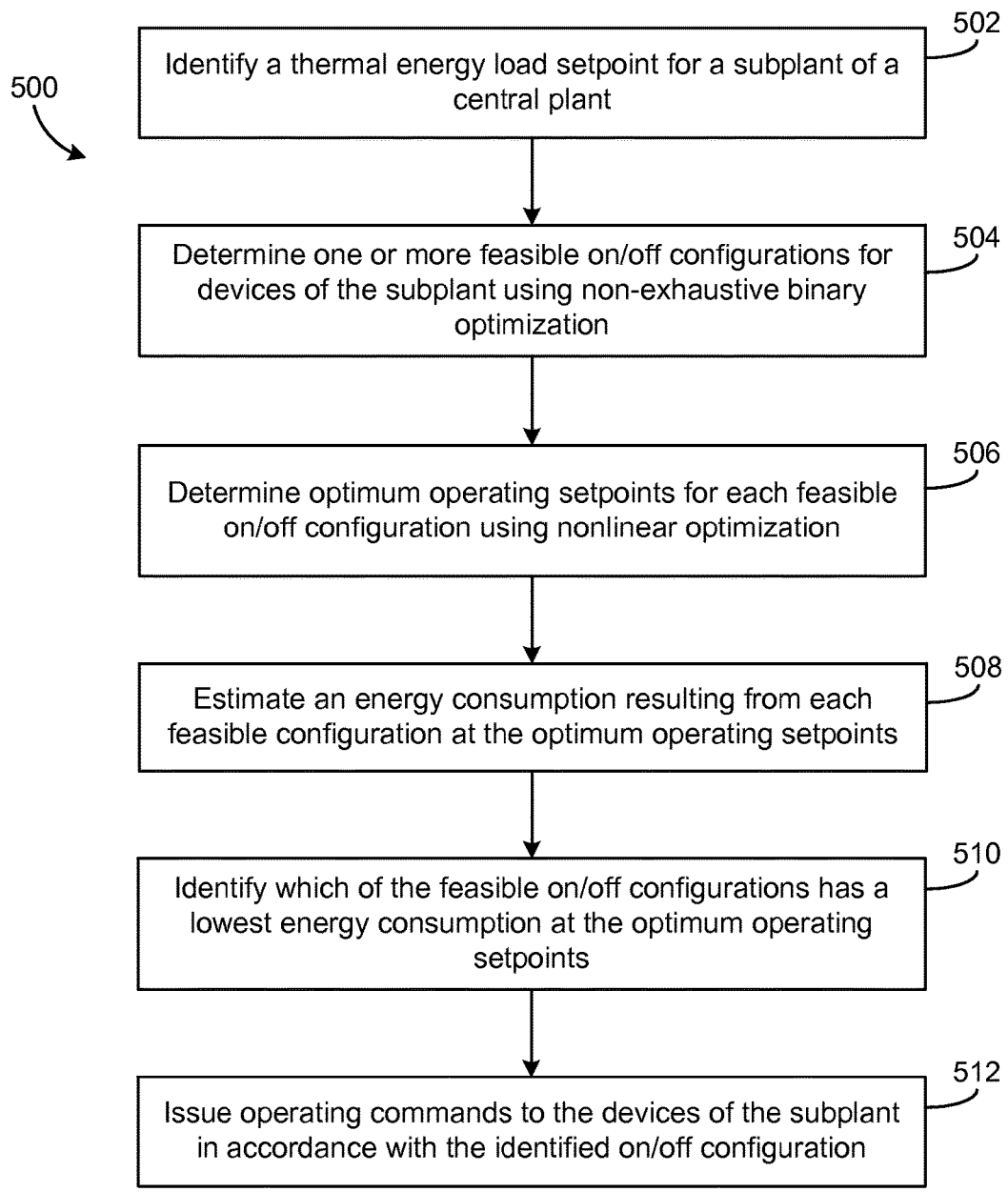
FIG. 5 is a flowchart of a low level optimization process that may be performed by the central plant controller of FIG. 2 to determine feasible on/off configurations for the central plant equipment and operating setpoints that optimize the amount of energy consumed by the plurality of subplants, according to an exemplary embodiment.

Referring now to FIG. 5, a flowchart of a process 500 for low level central plant optimization is shown, according to an exemplary embodiment. Process 500 may be performed by central plant controller 102, as described with reference to FIGS. 2-4. In some embodiments, process 500 is performed by processing circuit 106 of central plant controller 102 according to the instructions stored in low level optimizing module 132. Process 500 may be performed for each subplant of central plant 102 to determine feasible on/off configurations for the devices of the subplant and to identify which of the feasible on/off configurations is optimal (i.e., results in the lowest energy consumption). The optimal configuration may be provided to the devices of the subplant as an operating command.

Process 500 is shown to include identifying a thermal energy load setpoint for a subplant of a central plant (step 502). In some embodiments, step 502 includes receiving the thermal energy load setpoint from a high level optimization module or process. For example, high level optimization module 130 may be configured to perform a high level optimization process that determines a thermal energy load setpoint for each of subplants 12-22. The thermal energy load setpoints may be based on a predicted thermal energy load for a building or campus and/or utility rates defining the cost of one or more resources consumed by subplants 12-22 to serve the thermal energy loads. High level optimization module 130 may determine the optimal distribution of thermal energy loads across subplants 12-22, as described with reference to FIG. 2. In some embodiments, the optimal distribution of thermal energy loads results in the minimum cost to satisfy the predicted thermal energy requirements for the building or campus over a time horizon. In various embodiments, the thermal energy load setpoint identified in step 502 may be received from high level optimization module 132, retrieved from memory, or otherwise obtained from any other data source (e.g., specified by a user, received from an external system or process via a communications network, etc.).

Still referring to FIG. 5, process 500 is shown to include determining one or more feasible on/off configurations for devices of the subplant using non-exhaustive binary optimization (step 504). Step 504 may utilize binary optimization to determine one or more feasible combinations of devices that will satisfy the subplant load setpoint for an actual or expected set of conditions (e.g., load conditions, weather conditions, etc.). Feasible combinations may also satisfy any constraints on the system (e.g., maximum total power, minimum power per device, etc.).

According to an exemplary embodiment, the binary optimization performed in step 504 is accomplished using a branch and bound method. The branch and bound method recursively identifies solutions that satisfy the optimization constraints on the cost function $J_{LL}$ (i.e., feasible solutions). For example, the cost function $J_{LL}$ may be subject to load constraints based on the thermal energy load setpoint received in step 502 (i.e., ensuring that the energy load setpoint is met), capacity constraints defining a minimum and/or maximum capacity for each device represented in the cost function, timeout constraints preventing a device from being activated or deactivated within a threshold period after a change in operating status, or any other optimization constraints that may be applicable to the cost function $J_{LL}$. The solutions (or "branches") are combinations of on/off statuses for the subplant devices.

In some embodiments, step 504 includes determining upper and lower bounds for the cost function $J_{LL}$ given the identified solutions. The optimization seeks to minimize the cost function, and branches that do not do so are discarded or pruned. A first solution with a lower bound for the cost function that is greater than the upper bound of second solution's cost function may be eliminated as infeasible. This is because the first solution, at its best (i.e., lowest power consumption), is still higher than the worst or highest power consumption of the second solution. Other solutions are retained and may be compared to one another to determine the optimal solution.

According to an exemplary embodiment, binary optimization is non-exhaustive. That is, non-exhaustive optimization does not search every possible combination of devices to find the optimal solution. This advantageously increase computational efficiency. For example, with eight chillers, there are a possible $2^8$ or 256 combinations. In some embodiments, the non-exhaustive optimization finds the optimal solution in half or fewer searches. The binary optimization process is described in greater detail with reference to FIG. 7.

The on/off configurations determined in step 504 may be used as variables in a cost function representing the total energy consumption of the subplant. The cost function $J_{LL}$ describes the power consumption a particular subplant as a function of the binary on/off decisions and the device setpoints. The cost function may be of the form:

$$J_{LL}(\theta_{LL}) = \sum_{j=1}^{N} t_s \cdot b_j \cdot u_j(\theta_{LL})$$

where N is the number of devices in the subplant, $t_s$ is the duration of a time step, $b_j$ is a binary on/off decision (e.g., 0=off, 1=on), and $u_j$ is the energy used by device j as a function of the device setpoints $\theta_{LL}$. Each device may have continuous variables which can be changed to determine the lowest possible energy consumption for the overall input conditions.

In some instances, the subplant devices are chillers (e.g., for chiller subplant 16). Chiller power is typically a quadratic function of load and lift, and it is time-variant. As additional chillers are energized, the load per chiller decreases, therefore changing the energy consumption $u_j$ for each chiller in the cost function. According to an exemplary embodiment, the binary optimization may be configured to update with energy consumption values. In other instances, the subplant devices may include heating elements, heat exchangers, pumps, valves, cooling towers, or other equipment (e.g., equipment 60) that facilitate the functions of the subplant. The energy consumption values $u_j$ for each device may be different and may vary according to different equipment models for different types of devices (e.g., linear, quadratic, time-variant or invariant, etc.). Various components of low level optimization module 132 (FIG. 3) may be used in step 504 based on the different devices represented in the cost function. For example, quadratic compensation module 158 may be used when chillers are part of the cost function to account for chiller power's quadratic nature.

Still referring to FIG. 5, process 500 is shown to include determining optimum operating setpoints for each feasible on/off configuration using nonlinear optimization (step 506). Step 506 may utilize nonlinear optimization to minimize the cost function $J_{LL}$. According to various embodiments, direct and/or indirect search methods (e.g., downhill simplex (Nelder-Mead) method, GRG, SQP, Cauchy Method, Feltcher-Reeves Method, etc.), are used to perform nonlinear optimization. The setpoints determined in step 506 may define a capacity for each active subplant device that is capable of being operated at multiple different capacities. The setpoints may affect the power consumption for each feasible combination. Nonlinear optimization determines one or more setpoints that will further minimize power consumption.

Process 500 is shown to include estimating an energy consumption resulting from each feasible configuration at the optimum operating setpoints (step 508) and identifying which of the feasible on/off configurations has a lowest energy consumption at the optimum operating setpoints (step 510). In some embodiments, more than one combination may be feasible. For example, several different on/off configurations may meet the plant load requirements and satisfy the constraints on the system. However, each feasible combination may have a different resultant energy consumption.

In step 508, each feasible on/off configuration identified in step 504 is evaluated at the optimum operating setpoints identified in step 506 to determine an energy consumption that results from each feasible combination. The optimum operating setpoints may be different for each feasible configuration. For example, the optimum operating capacity for a chiller when three chillers are active may be lower than the optimum operating capacity of the chiller when only two chillers are active to serve the same thermal energy load. In step 510, the on/off configuration with the lowest energy consumption at the optimal setpoints is identified. The configuration and setpoints identified in step 510 may represent the optimal (i.e., lowest energy consumption) solution that satisfies all of the constraints on the cost function.

Still referring to FIG. 5, process 500 is shown to include issuing operating commands to the devices of the subplant in accordance with the identified on/off configuration (step 512). Step 510 may include sending operating commands to a building automation system (e.g., BAS 108) configured to control the subplant devices, a subplant level controller, or an equipment level controller for the subplant devices. The operating commands may specify which of the subplant devices are active, (i.e., "on"), which of the subplant devices are inactive (i.e., "off"), and, in some embodiments, setpoints for each active subplant device. The on/off statuses and setpoints provided in step 512 may override any previous control decisions indicating which devices are active and/or setpoints for each active device.

Figure 6:
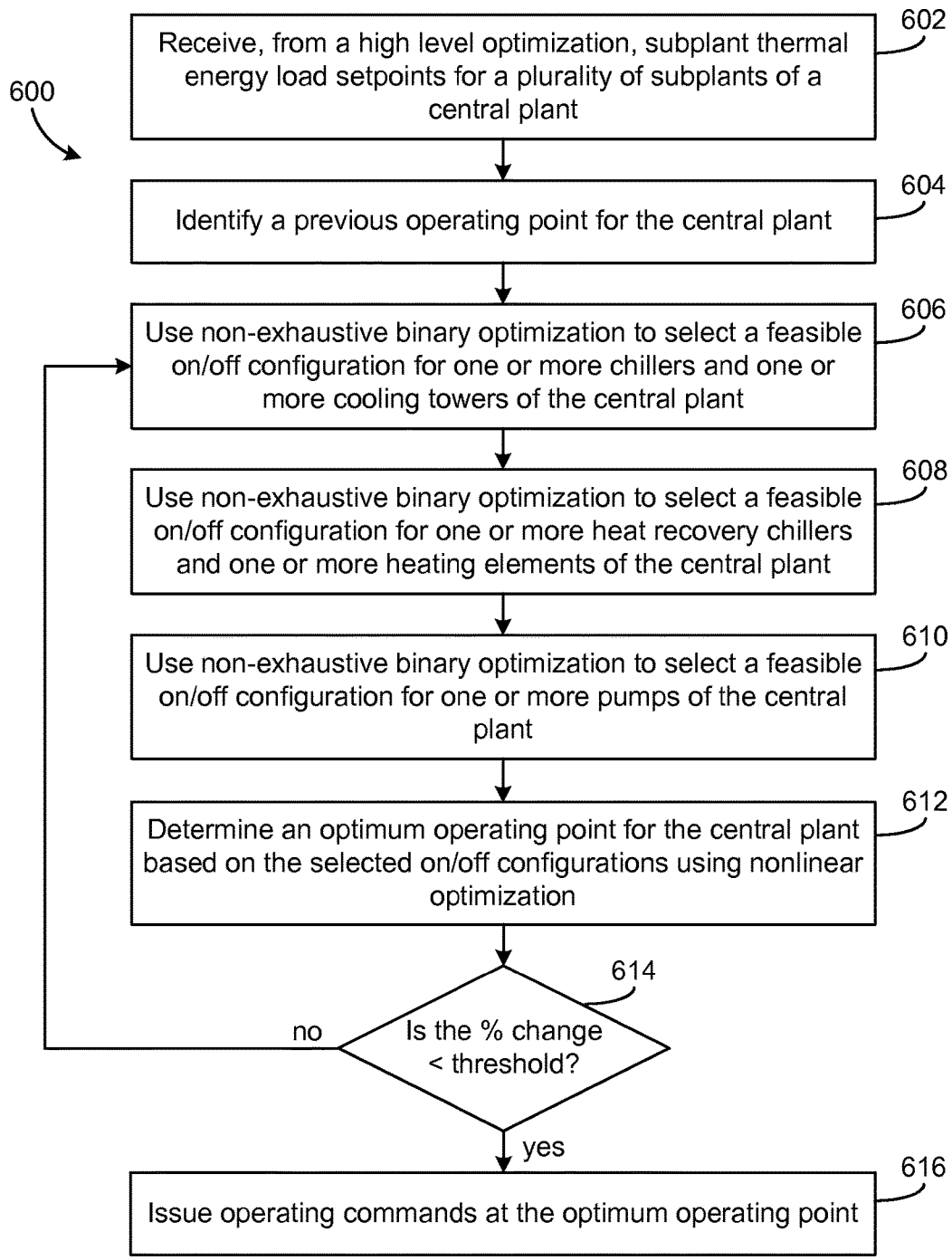
FIG. 6 is a flowchart of another low level optimization process that may be performed by the central plant controller of FIG. 2 as a specific implementation of the process of FIG. 5 to determine feasible on/off configurations and operating setpoints for the central plant equipment, according to an exemplary embodiment.

Referring now to FIG. 6, a flowchart of a process 600 for low level central plant optimization is shown, according to an exemplary embodiment. Process 600 may be performed by central plant controller 102, as described with reference to FIGS. 2-4, and may be a specific implementation of process 500. In some embodiments, process 600 is performed by processing circuit 106 of central plant controller 102 according to the instructions stored in low level optimizing module 132. Process 600 may be used to determine an optimal operating point for a central plant and to issue operating commands to various devices of the central plant at the optimum operating point.

Process 600 is shown to include receiving, from a high level optimization, subplant thermal energy load setpoints for a plurality of subplants of a central plant (step 602). In some embodiments, step 602 includes receiving the thermal energy load setpoints from a high level optimization module or process. For example, high level optimization module 130 may be configured to perform a high level optimization process that determines a thermal energy load setpoint for each of subplants 12-22. The thermal energy load setpoints may be based on a predicted thermal energy load for a building or campus and/or utility rates defining the cost of one or more resources consumed by subplants 12-22. High level optimization module 130 may determine the optimal distribution of thermal energy loads across subplants 12-22, as described with reference to FIG. 2. In some embodiments, the optimal distribution of thermal energy loads across subplants 12-22 results in the minimum cost to satisfy the predicted thermal energy requirements for the building or campus over a time horizon.

Still referring to FIG. 6, process 600 is shown to include identifying a previous operating point for the central plant (step 604). The previous operating point may include on/off statuses and/or operating setpoints for various devices of the central plant at a previous time step. In some embodiments, step 604 includes retrieving the previous operating point from subplant control module 138. Subplant control module 138 may store historical data regarding past operating statuses, past operating setpoints, and instructions for calculating and/or implementing control parameters for subplants 12-22. Subplant control module 138 may also receive, store, and/or transmit data regarding the conditions of individual devices of the central plant, such as operating efficiency, equipment degradation, a date since last service, a lifespan parameter, a condition grade, or other device-specific data. Subplant control module 138 may also receive and store on/off statuses and operating setpoints from low level optimization module 132. Step 604 may include retrieving such data from subplant control module 138 and using the retrieved data to identify the previous operating point.

Process 600 is shown to include using non-exhaustive binary optimization to select a feasible on/off configuration for one or more chillers and one or more cooling towers of the central plant (step 606), a feasible on/off configuration for one or more heat recovery chillers and one or more heating elements of the central plant (step 608), and a feasible on/off configuration for one or more pumps of the central plant (step 610). Steps 606-610 may be the same or similar to step 504, as described with reference to FIG. 5. For example, steps 606-610 may utilize binary optimization to determine one or more feasible combinations of devices within a particular subplant of the central plant that satisfy the thermal energy load setpoint for the subplant for an actual or expected set of conditions (e.g., load conditions, weather conditions, etc.). Feasible combinations may also satisfy any constraints on the system (e.g., maximum total power, minimum power per device, etc.).

In some embodiments, steps 606-610 include selecting a feasible on/off configuration for the devices of each subplant that minimizes the amount of energy consumption by the subplant. The energy consumption of a subplant may be represented with the cost function:

$$J_{LL}(\theta_{LL}) = \sum_{j=1}^{N} t_s \cdot b_j \cdot u_j(\theta_{LL})$$

where N is the number of devices in the subplant, $t_s$ is the duration of a time step, $b_j$ is a binary on/off decision (e.g., 0=off, 1=on), and $u_j$ is the energy used by device j as a function of the device setpoints $\theta_{LL}$. The selected feasible combination may minimize the cost function $J_{LL}$ subject to the subplant load constraints and any other constraints on the optimization.

Still referring to FIG. 6, process 600 is shown to include determining an optimum operating point for the central plant based on the selected on/off configurations using nonlinear optimization (step 612). Step 612 may be the same or similar to step 506, as described with reference to FIG. 5. For example, step 612 may utilize nonlinear optimization to determine a setpoint vector $\theta_{LL}$ that minimizes the cost function $J_{LL}$ subject to the optimization constraints. According to various embodiments, direct and/or indirect search methods (e.g., downhill simplex (Nelder-Mead) method, GRG, SQP, Cauchy Method, Feltcher-Reeves Method, etc.), are used to perform nonlinear optimization.

The setpoints determined in step 612 may define a capacity for each active device that is capable of operating at multiple different capacities and may affect the power consumption for each feasible combination. The nonlinear optimization performed in step 612 determines one or more setpoints that minimize the power consumption for each feasible combination. In some embodiments, the combination of the optimum on/off configurations and the optimum device setpoints define the optimum operating point.

Process 600 is shown to include determining whether the percent change in the optimum operating point is less than a threshold (step 614). Step 614 may include comparing the optimum operating point determined in step 612 with the previous operating point identified in step 604. The comparison may include comparing on/off states and/or setpoints for various devices of the central plant. In various embodiments, the comparison may be performed for each device individually or for a grouping of devices (e.g., within each subplant, within each category identified separately in steps 606-610, within each type of device, etc.). For example, the operating point may be device specific, subplant specific, device type specific, or a general (e.g., average) operating point for all of the devices of the central plant.

If the percent change between the previous operating point identified in step 604 and the optimum operating point determined in step 612 is less than a threshold value (i.e., the result of step 614 is "yes"), it may be determined that the optimization process is converging on an optimal value. If the percent change determined in step 614 is less than the threshold value, process 600 may proceed to issuing operating commands at the optimum operating point (step 616). Step 616 may include sending operating commands to a building automation system (e.g., BAS 108) configured to control the subplant devices, a subplant level controller, or an equipment level controller for the subplant devices. The operating commands may specify which of the subplant devices are active, (i.e., "on"), which of the subplant devices are inactive (i.e., "off"), and, in some embodiments, setpoints for each active subplant device. The on/off statuses and setpoints provided in step 616 may override any previous control decisions indicating which devices are active and/or setpoints for each active device.

If the percent change between the previous operating point identified in step 604 and the optimum operating point determined in step 612 is not less than the threshold value (i.e., the result of step 614 is "no"), it may be determined that the optimization process is not converging on an optimal value or that the convergence has not stabilized sufficiency. If the percent change determined in step 614 is not less than the threshold value, process 600 may return to step 606. Steps 606-614 may be repeated until the optimum operating point converges on a particular value (i.e., the percent change determined in step 614 is less than the threshold).

Figure 7:
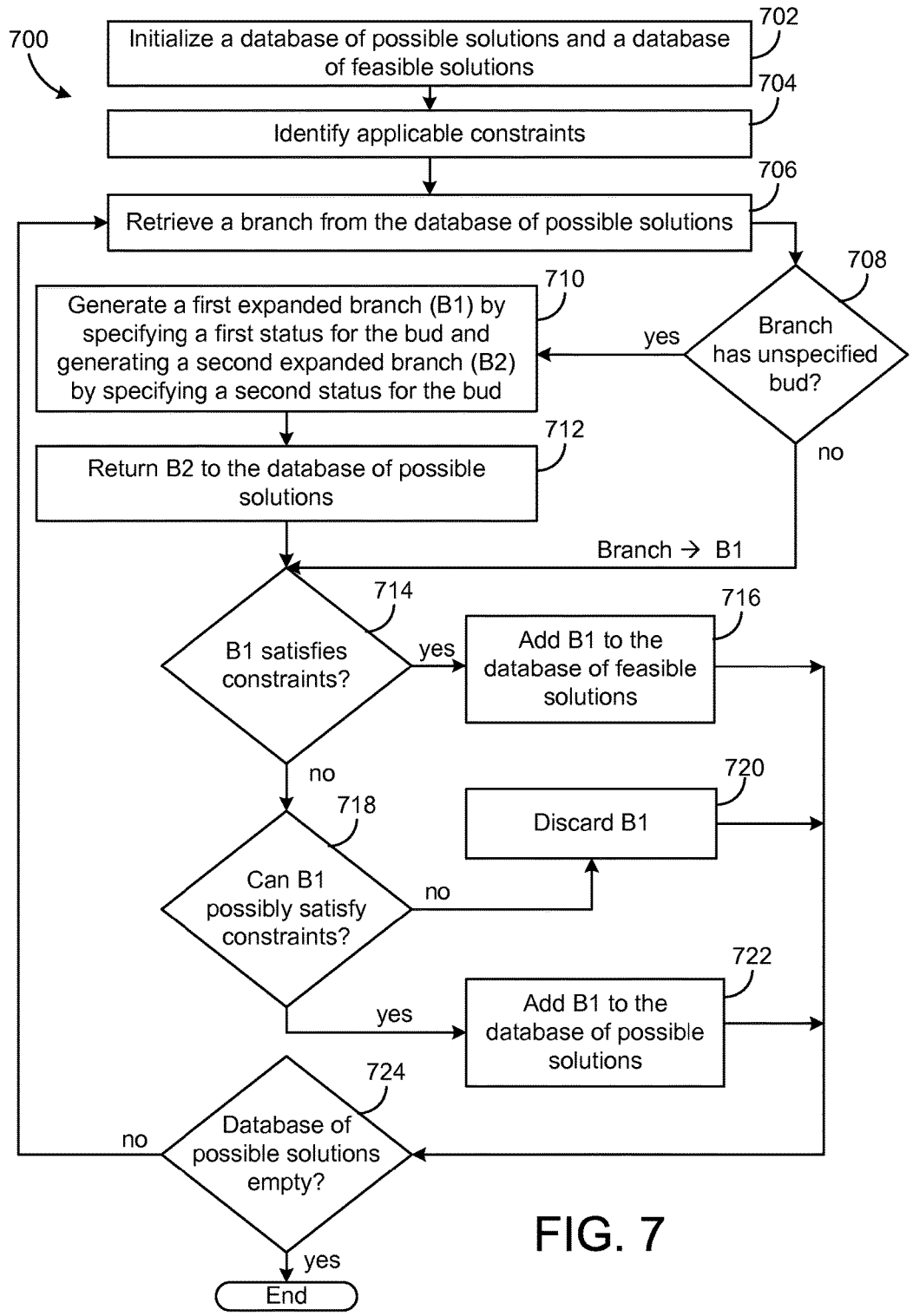
FIG. 7 is a flowchart of a binary optimization process that may be performed by the central plant controller of FIG. 2 to determine feasible on/off configurations for the central plant equipment, according to an exemplary embodiment.

Referring now to FIG. 7, a flowchart of a non-exhaustive binary optimization process 700 is shown, according to an exemplary embodiment. Process 700 may be performed by central plant controller 102, as described with reference to FIGS. 2-4, and may be used to determine one or more feasible on/off configurations of devices for a particular subplant. In some embodiments, process 700 may be used to accomplish step 504 of process 500 and/or and steps 606-610 of process 600. Process 700 may be performed by processing circuit 106 of central plant controller 102 according to the instructions stored in non-exhaustive binary optimization module 156.

Process 700 is shown to include initializing a database of possible solutions and a database of feasible solutions (step 702). The database of possible solutions may contain on/off combinations that are estimated to be capable of satisfying the thermal energy load and the optimization constraints for the subplant. Combinations may be characterized as "branches," as graphically represented as in FIGS. 8A-8D. A branch corresponds to a particular combination (or some portion thereof) of on/off statuses for one or more devices. Each on/off status may be described as a "bud." For example, in branch 852 of FIG. 8A, the "on" status of chiller 1 and the "on" status of chiller 2 are each individual buds.

Combinations of on/off statuses may additionally be described by strings, vectors, arrays, or other sets of the binary variable $b_i$. For example, branch 858 of FIG. 8D may be described as [1, 1, 0, 1] (i.e., chiller 1 on, chiller 2 on, chiller 3 off, and chiller 4 on). In general, the description of a branch (i.e., a combination of buds) is of the form [a, . . . , a, B, c, . . . , c]. "B" represents the bud or device that is presently being considered (i.e., to determine whether the device should be on or off). B may be characterized as the "working bud." a, . . . , a represents the combination of devices that was previously considered (i.e., devices that are turned on/off before the device corresponding to the working bud). Each device in the set a, . . . , a may have a specified on/off status (e.g., a=0 or a=1). c, . . . , c represents the combination of devices that will be considered after the working bud device has been determined to be on or off. Each device in the set c, . . . , c may have an unspecified on/off status (e.g., c=?).

The general description [a, . . . , a, B, c, . . . , c] may represent any number and/or type of devices. For example, a, . . . , a can include zero or more devices, B can include one or more devices, and c, . . . , c can include zero or more devices. According to an exemplary embodiment, the a, . . . , a devices have lower power consumption than the working bud device and, thus, the a, . . . , a devices are considered before the working bud device. Similarly, the working bud device may have a lower power consumption than the c, . . . , c devices, which are considered after the working bud device. In other words, combinations of subplant devices may be considered in order of increasing power consumption.

A combination may be stored in possible solutions database if the combination can potentially satisfy all of the applicable constraints (e.g., subplant load constraints, device capacity constraints, etc.), considering any unspecified operating statuses as wildcards. For example, if the combination [1, 1, 0, 1] satisfies the constraints but the combination [1, 1, 0, 0] does not, the combination [1, 1, 0, ?] would satisfy the constraints because the unspecified operating status can be either on (1) or off (0).

According to an exemplary embodiment, determining one or more optimal on/off combinations is an iterative process. For example, a portion of a combination of devices may be considered to determine whether that combination has any chance of satisfying the load requirements and/or system constraints. If there is some possibility that the combination could do so, then the combination may be returned to the possible solutions database. The database of feasible solutions may contain on/off combinations that have been determined to satisfy the applicable constraints. A combination may be moved from the possible solutions database to the feasible solutions database if it is determined that the combination satisfies the applicable constraints.

Still referring to FIG. 7, process 700 is shown to include identifying applicable constraints (step 704). The applicable constraints may define one or more requirements that must be satisfied for a combination of on/off statuses to be feasible. In other words, feasible combinations may be those that satisfy the applicable constraints. Step 704 may include determining the subplant load setpoint to be met, the number and type of subplant devices, the maximum and minimum operating capacity of the devices, the operating condition and estimated power consumption of each device, etc. Applicable constraints may be received at low level optimization module 132 from high level optimization module 130 (e.g., subplant load constraints), equipment models 120 (e.g., equipment capacity constraints), BAS 108 (e.g., user-defined constraints, timeout constraints, etc.), or any other data source.

Process 700 is shown to include retrieving a branch from the database of possible solutions (step 706) and determining whether the branch has an unspecified bud (step 708). Each branch corresponds to a particular combination (or some portion thereof) of on/off statuses for one or more devices. In some embodiments, the possible solutions database stores a plurality of branches and an estimated power consumption associated with each branch. The branches in the possible solutions database may be sorted (e.g., in ascending order) by the power consumption associated with each branch. In some embodiments, step 706 includes retrieving the branch with the lowest associated power consumption. If the branch has one or more unspecified buds, the associated power consumption may be an estimated power consumption for only the devices represented by specified buds. In some embodiments, step 708 includes identifying the first unspecified bud as the working bud.

If the branch has an unspecified bud (i.e., the result of step 708 is "yes"), process 700 may proceed to generating a first expanded branch (B1) by specifying a first status for the bud and generating a second expanded branch (B2) by specifying a second status for the bud (step 710). The status of the unspecified bud may be specified as "on" or "off," which may be represented by a variety of binary indicators (e.g., 0=off, 1=on, etc.). In some embodiments, the first expanded branch specifies the status of the bud as "on" and the second expanded branch specifies the status of the bud as "off." In other embodiments, the first expanded branch specifies the status of the bud as "off" and the second expanded branch specifies the status of the bud as "on." The first expanded branch B1 may be retained for further evaluation in steps 714-724 and the second expanded branch B2 may be returned to the database of possible solutions (step 712). If the branch retrieved in step 706 does not have an unspecified bud (i.e., the result of step 708 is "no"), process 700 may identify the branch as B1 and proceed to step 714.

Still referring to FIG. 7, process 700 is shown to include determining whether the branch B1 satisfies the applicable constraints (step 714). The branch B1 evaluated in step 714 may be the first expanded branch generated in step 710 (e.g., if steps 710-712 are performed) or the branch retrieved from the possible solutions database in step 706 (e.g., if steps 710-712 are not performed). Step 714 may include determining whether the combination of active devices specified by the branch satisfies the constraints identified in step 704. If the branch B1 includes one or more unspecified buds, the determination in step 714 may assume that any unspecified buds have a status of "off." If the branch B1 satisfies the applicable constraints (i.e., the result of step 714 is "yes"), process 700 may proceed to add the branch B1 to the database of feasible solutions (step 716) and proceed to step 724. Adding the branch B1 to the database of feasible solutions may indicate that the devices specified as "on" in the branch B1 can be operated to satisfy the applicable constraints without requiring any additional devices.

If the branch B1 does not satisfy the applicable constraints (i.e., the result of step 714 is "no"), process 700 may proceed determining whether the branch B1 can possibly satisfy the applicable constraints (step 718). Step 718 may include determining whether the branch is capable of satisfying the applicable constraints if one or more additional devices are used. The additional devices may be selected from the set of devices with an unspecified status in the branch B1. For example, if the branch B1 includes one or more unspecified buds, step 718 may include determining whether the branch could satisfy the applicable constraints if one or more of the unspecified buds are subsequently specified as "on."

If the branch B1 cannot possibly satisfy the applicable constraints (i.e., the result of step 718 is "no"), process 700 may proceed to discard the branch B1 (step 720) and proceed to step 724. Discarding the branch may include adding the branch to a discard database (e.g., discard database 166) and/or removing the branch from further consideration as a potential solution. If the branch does not have any unspecified buds, process 700 may automatically advance from step 718 to step 720 since adding further devices is not possible. If the branch B1 can possibly satisfy the applicable constraints (i.e., the result of step 718 is "yes"), process 700 may proceed to add the branch B1 to the database of possible solutions (step 722) and proceed to step 724. Adding the branch B1 to the database of possible solutions may allow the branch to be further evaluated in a subsequent iteration of process 700.

Still referring to FIG. 7, process 700 is shown to include determining whether the database of possible solutions is empty (step 724). The database of possible solutions may be empty once all of the branches in the database of possible solutions are either moved to the database of feasible solutions or discarded as an infeasible solution. Not every potential combination may be considered in a non-exhaustive optimization. For example, entire branches may be discarded without evaluating every individual combination based on the branch. Advantageously, this allows the binary optimization to identify an optimal solution without processing or evaluating every possible combination. If any branches remain in the database of possible solutions, process 700 may return to step 706 and repeat steps 706-724. Otherwise, process 700 may end.

Referring now to FIGS. 8A-8D, graphical representations of combinations of the devices are shown, according to exemplary embodiments. The combinations are depicted in a tree structures, with branches representing combinations of devices and buds representing the on/off status of individual devices. FIGS. 8A-8D represent four chillers. According to an exemplary embodiment, chiller 1 results in the least power consumption. The remaining chillers result in incrementally greater power consumption, with chiller 4 resulting in the comparatively largest power consumption. FIGS. 8A-8D are shown to include branches starting with the chiller 1 on. The tree structures (i.e., database, array, data object, etc.) may be created, maintained, updated, processed, and/or stored in possible solutions database 168, feasible solutions database 164, and/or discard database 166. The computations reflected in the tree structures (e.g., on/off statuses) of FIGS. 8A-8D may be completed by central plant controller 102.

The tree structures of FIGS. 8A-8D may be output to at least one of a memory device, a user device, or another device on the building management system. The output may be a graphical user interface (e.g., on a client device, on a mobile device, generated by a web server, etc.). For example, the tree structure of FIG. 8A may be output to monitoring and reporting applications 136 via GUI engine 116 (FIG. 12). Depending on the embodiment, the tree structure may include a portion or all of the branches and buds of data shown in FIGS. 8A-8D. In some embodiments, a user may be able, via a user interface, to choose which branches and buds should be visible. A user may also be able to add branches and buds of data not shown in FIGS. 8A-D including, e.g., branches with chiller 1 off. In other embodiments, the processes described herein will operate without displaying a graphical representation of a combination. While the tree structures of FIGS. 8A-8D are shown as two-dimensional figures, another information structure suitable for representing and storing the data of the chart may be used. For example, a relational database having one or more related tables may be used.

Figure 8A:
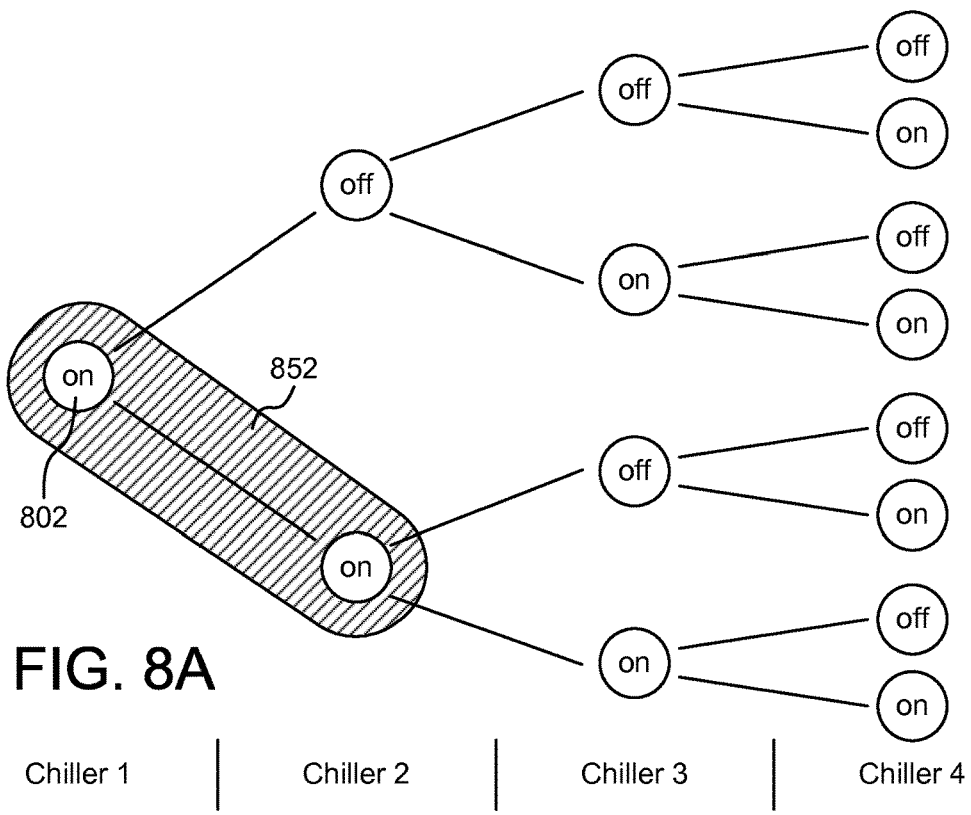
FIGS. 8A-8D are branch and bound diagrams illustrating several potential branches (i.e., combinations of on/off statuses for the central plant equipment) that may be considered as possible solutions in the binary optimization process of FIG. 7, according to an exemplary embodiment.

Referring to FIG. 8A, a graphical representation of a combination of devices is shown, according to an exemplary embodiment. Bud 802 may represent the working bud of the live branch (i.e., the device being considered in a possible or feasible combination of devices). Combination 852 includes chiller 1 on and chiller 2 on. The on/off status of additional devices (e.g., chiller 3 and chiller 4) may be added to combination 852 as part of determining alternate combinations of devices that will also satisfy plant load.

Figure 8B:
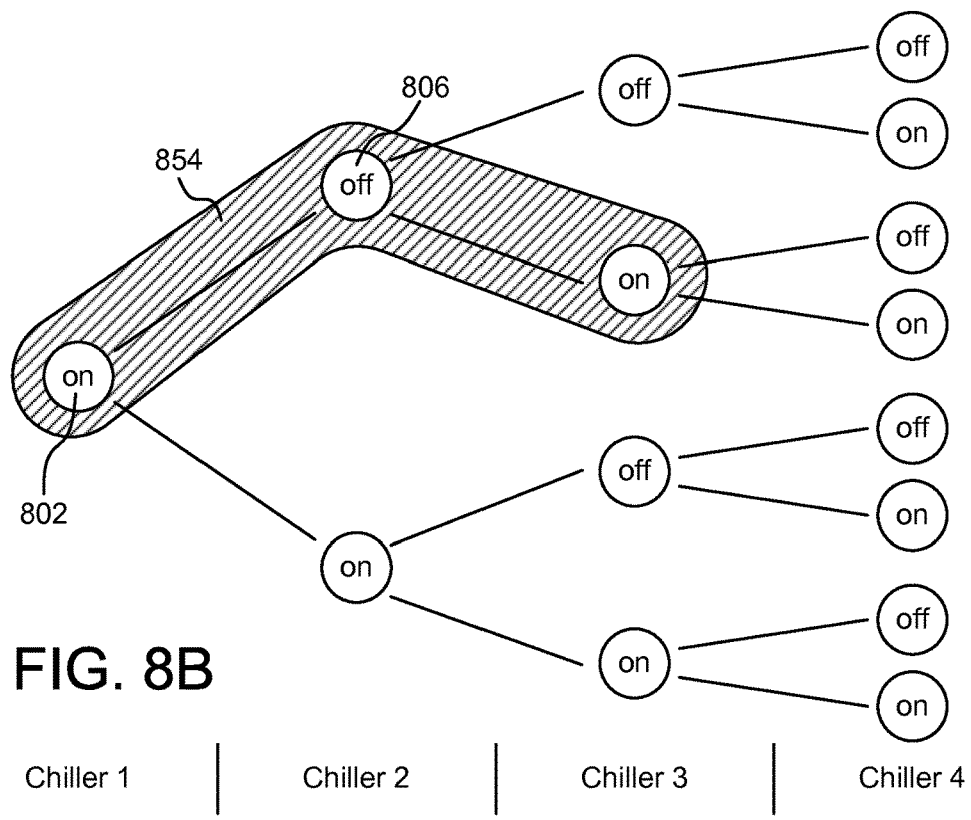

Referring to FIG. 8B, a graphical representation of another combination of devices is shown, according to an exemplary embodiment. Bud 802 may be the working bud. Combination 854 includes chiller 1 on, chiller 2 off, and chiller 3 on. The on/off status of additional devices (e.g., chiller 4) may be added to combination 854 as part of determining alternate combinations of devices that will satisfy plant load. In another embodiment, bud 806 may be the working bud.

Figure 8C:
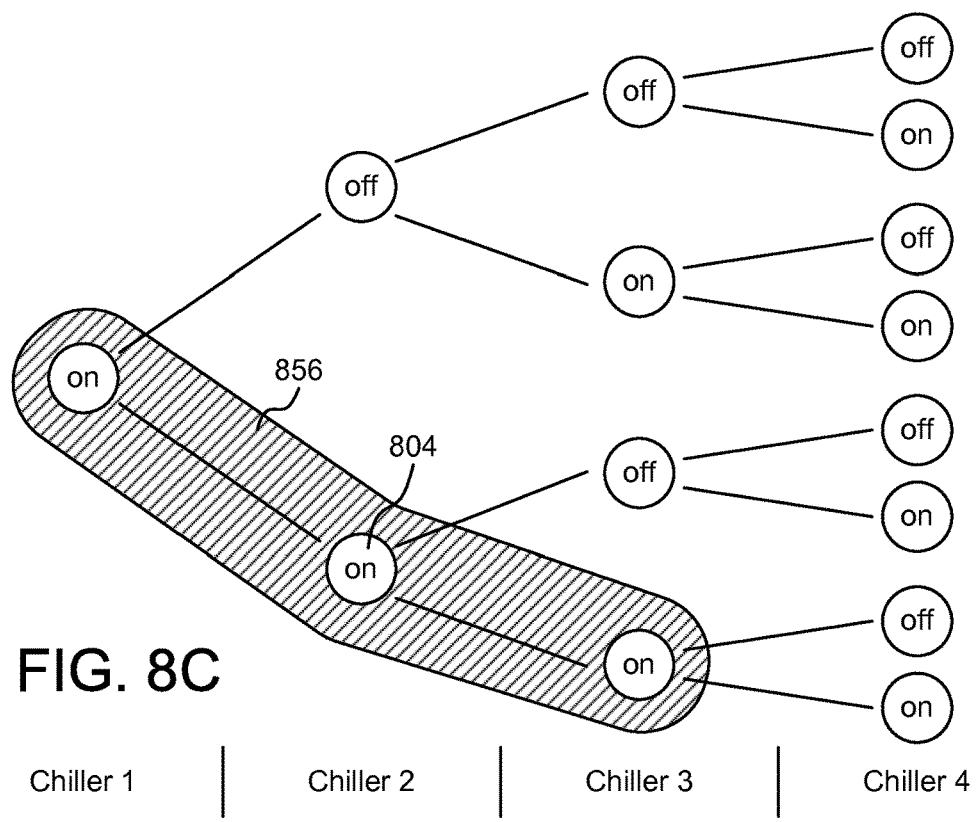

Referring to FIG. 8C, a graphical representation of another combination of devices is shown, according to an exemplary embodiment. Bud 804 may represent the working bud of the live branch. Combination 856 includes chiller 1 on, chiller 2 on, and chiller 3 on. The "on" status of chiller 1 is representative of previous devices in the branch. The on/off status of additional devices (e.g., chiller 4) may be added to combination 856 as part of determining alternate combinations of devices that will also satisfy plant load.

Figure 8D:
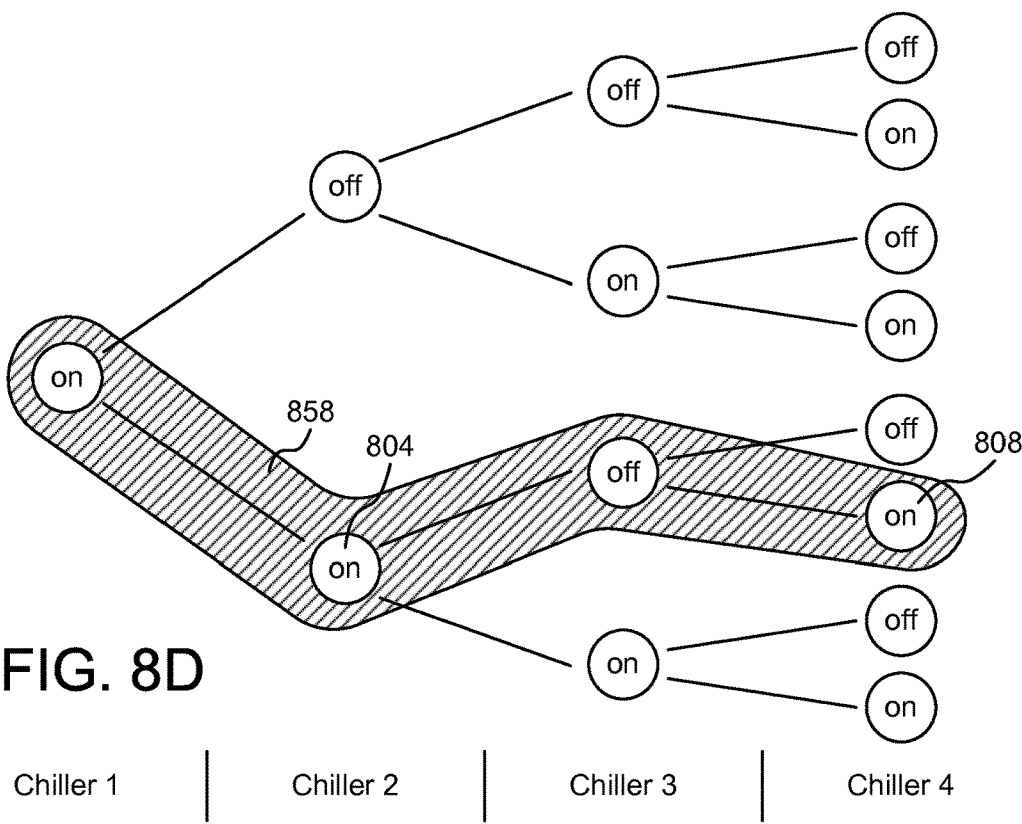

Referring to FIG. 8D, a graphical representation of yet another combination of devices is shown, according to an exemplary embodiment. Bud 804 may be the working bud. Combination 858 includes chiller 1 on, chiller 2 on, chiller 3 off, and chiller 4 on. Combination 858 may represent the working bud device on, the next device off, and the following device on. The "on" status of chiller 1 is representative of previous devices in the branch. In an embodiment with a chiller plant of four devices, bud 808 may represent the last bud.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for a central plant having a plurality of subplants that serve thermal energy loads of a building or building system, the controller comprising:
  a processing circuit comprising a processor and memory, wherein the processing circuit is configured to identify a thermal energy load setpoint for a subplant of the central plant, wherein the thermal energy load setpoint is generated by a high level optimization that determines optimum thermal energy load setpoints for each of the plurality of subplants by optimally distributing a predicted thermal energy load for the building across the plurality of subplants;
  a low level optimization module comprising a binary optimization module of the processing circuit configured to use binary optimization to determine one or more feasible on/off configurations for equipment of the subplant to achieve the thermal energy load setpoint generated by the high level optimization;
  the low level optimization module comprising a setpoint evaluator module of the processing circuit configured to determine optimum operating setpoints for the subplant equipment for each feasible on/off configuration;
  the low level optimization module configured to generate a resource consumption curve for the subplant by optimizing an amount of resource consumption by the subplant for several different combinations of thermal energy load and weather conditions, the resource consumption curve indicating a minimum amount of resource consumption by the subplant as a function of a thermal energy load on the subplant;
  a subplant control module of the processing circuit configured to generate operating parameters for the subplant equipment, the operating parameters comprising at least one of the feasible on/off configurations and the optimum operating setpoints; and
  a communications interface coupled to the processing circuit and configured to output the generated operating parameters for use in controlling the subplant equipment.

2. The controller of claim 1, further comprising a constraints evaluator module configured to identify applicable constraints for the subplant equipment;
  wherein each feasible on/off configuration satisfies the applicable constraints and is estimated to result in the subplant equipment meeting the thermal energy load setpoint.

3. The controller of claim 1, wherein the binary optimization module uses a branch and bound method to determine the one or more feasible on/off configurations.

4. The controller of claim 1, wherein the setpoint evaluator module determines the optimum operating setpoints using a nonlinear optimization that minimizes an amount of power consumed by the subplant equipment.

5. The controller of claim 1, wherein the setpoint evaluator module is configured to:
  estimate an amount of power consumed by each feasible on/off configuration of the subplant equipment at the optimum operating setpoints; and
  identify which of the feasible on/off configurations is estimated to result in a lowest amount of power consumed by the subplant equipment at the optimum operating setpoints.

6. A method for controlling a central plant having a plurality of subplants that serve thermal energy loads of a building or building system, the method comprising:
  identifying, by a processing circuit of a controller for the central plant, a thermal energy load setpoint for a subplant of the central plant, wherein the thermal energy load setpoint is generated by a high level optimization that determines optimum thermal energy load setpoints for each of the plurality of subplants by optimally distributing a predicted thermal energy load for the building across the plurality of subplants;
  using, by a binary optimization module of the processing circuit, binary optimization to determine one or more feasible on/off configurations for equipment of the subplant to achieve the thermal energy load setpoint generated by the high level optimization;
  generating a resource consumption curve for the subplant by optimizing an amount of resource consumption by the subplant for several different combinations of thermal energy load and weather conditions, the resource consumption curve indicating a minimum amount of resource consumption by the subplant as a function of a thermal energy load on the subplant;
  determining, by a setpoint evaluator module of the processing circuit, optimum operating setpoints for the subplant equipment for each feasible on/off configuration;
  generating, by a subplant control module of the processing circuit, operating parameters for the subplant equipment, the operating parameters comprising at least one of the feasible on/off configurations and the optimum operating setpoints; and outputting the generated operating parameters via a communications interface coupled to the processing circuit for use in controlling the subplant equipment.

7. The method of claim 6, further comprising:
identifying applicable constraints for the subplant equipment;
wherein each feasible on/off configuration satisfies the applicable constraints and is estimated to result in the subplant equipment meeting the thermal energy load setpoint.

8. The method of claim 6, wherein determining the one or more feasible on/off configurations comprises using a branch and bound method.

9. The method of claim 6, wherein determining the optimum operating setpoints comprises using a nonlinear optimization that minimizes an amount of power consumed by the subplant equipment.

10. The method of claim 6, further comprising:
estimating an amount of power consumed by each feasible on/off configuration of the subplant equipment at the optimum operating setpoints; and
identifying which of the feasible on/off configurations is estimated to result in a lowest amount of power consumed by the subplant equipment at the optimum operating setpoints.

11. A method for determining optimum operating parameters for equipment of a central plant that serves thermal energy loads of a building or building system, the method comprising:
identifying, by a controller for the central plant, a thermal energy load setpoint for a subplant of the central plant, wherein the thermal energy load setpoint is generated by a high level optimization that determines optimum thermal energy load setpoints for each of a plurality of subplants of the central plant by optimally distributing a predicted thermal energy load for the building across the plurality of subplants;
initializing, by the controller for the central plant, a database of possible solutions and a database of feasible solutions that achieve the thermal energy load setpoint generated by the high level optimization;
generating, by the controller, a resource consumption curve for the subplant by optimizing an amount of resource consumption by the subplant for several different combinations of thermal energy load and weather conditions, the resource consumption curve indicating a minimum amount of resource consumption by the subplant as a function of a thermal energy load on the subplant;
retrieving, by the controller, a branch from the database of possible solutions, the branch comprising a specified operating status for one or more devices of the equipment of the central plant;
determining, by the controller, whether the branch satisfies applicable constraints for the equipment of the central plant using the specified operating status;
adding, by the controller, the branch to the database of feasible solutions in response to a determination that the branch satisfies the applicable constraints; and
generating, by the controller, operating parameters for the equipment of the central plant, the operating parameters comprising the operating status specified by the branch in the database of feasible solutions.

12. The method of claim 11, wherein the branch comprises a specified operating status for a first device of the equipment of the central plant and an unspecified operating status for a second device of the equipment of the central plant.

13. The method of claim 12, further comprising:
creating a first expanded branch by specifying a first operating status for the second device, wherein the determining, adding, and generating steps are performed for the first expanded branch;
creating a second expanded branch by specifying a second operating status for the second device; and
adding the second expanded branch to the database of possible solutions for evaluation in a subsequent iteration of the method.

14. The method of claim 13, further comprising, in response to a determination that the first expanded branch does not satisfy the applicable constraints:
determining whether the first expanded branch can possibly satisfy the applicable constraints if an unspecified operating status in the first expanded branch is subsequently specified; and
adding the first expanded branch to the database of possible solutions for evaluation in a subsequent iteration of the method in response to a determination that the first expanded branch can possibly satisfy the applicable constraints.

15. The method of claim 11, further comprising estimating an amount of power consumed by each branch in the database of possible solutions;
wherein retrieving the branch from the database of possible solutions comprises retrieving the branch with the lowest estimated power consumption.

16. The method of claim 11, further comprising estimating an amount of power consumed by each branch in the database of feasible solutions;
wherein the generated operating parameters comprise the operating status specified by the branch in the database of feasible solutions with the lowest estimated power consumption.

* * * * *